(12) United States Patent
Lee et al.

(10) Patent No.: US 9,678,351 B2
(45) Date of Patent: Jun. 13, 2017

(54) STEREOSCOPIC DISPLAY DEVICE AND DASHBOARD USING THE SAME

(71) Applicant: LG INNOTEK CO., LTD., Seoul (KR)

(72) Inventors: Dong Hyun Lee, Seoul (KR); Youn Mo Jeong, Seoul (KR); Kyu Sung Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 94 days.

(21) Appl. No.: 14/611,533

(22) Filed: Feb. 2, 2015

(65) Prior Publication Data

US 2015/0219913 A1  Aug. 6, 2015

(30) Foreign Application Priority Data

Feb. 3, 2014  (KR) .................. 10-2014-0012058
Feb. 4, 2014  (KR) .................. 10-2014-0012574

(51) Int. Cl.
*G02B 27/22*  (2006.01)
*B60K 37/02*  (2006.01)
(Continued)

(52) U.S. Cl.
CPC .......... *G02B 27/2235* (2013.01); *B60K 37/02* (2013.01); *B60Q 3/04* (2013.01);
(Continued)

(58) Field of Classification Search
CPC .. G02B 6/0058; G02B 6/0036; G02B 27/225; G02B 6/0038; G02B 6/0061;
(Continued)

(56) References Cited

U.S. PATENT DOCUMENTS 6,074,069 A  *  6/2000  Chao-Ching ........ G02B 6/0061
                                                              362/23.15
6,820,991 B2    11/2004  Wakaki et al.
(Continued)

FOREIGN PATENT DOCUMENTS

JP   2000-304575 A    11/2000
JP   2008-180823 A    8/2008
WO   WO 2012/027441 A2  3/2012

OTHER PUBLICATIONS

Extended European Search Report dated Jun. 30, 2015 issued in Application No. 15153675.2.

*Primary Examiner* — Euncha Cherry
(74) *Attorney, Agent, or Firm* — KED & Associates LLP

(57) ABSTRACT

Provided is a stereoscopic display device, including: a base substrate transmitting an incident beam; and a three-dimensional effect forming part on a first surface of the base substrate, wherein the three-dimensional effect forming part has a pattern, the pattern having multiple pattern units arranged in a concentric circular, elliptical or polygonal radial form, each of the pattern units having an inclined surface having an inclination angle with respect to the first surface, and wherein when an incident beam is incident to a central portion of the pattern, the pattern guides the incident beam in a first surface direction toward which the first surface looks or a second surface direction toward which a second surface opposite to the first surface looks, thereby displaying a line-shaped beam having a three-dimensional effect in a first path resulting a pattern arrangement direction.

13 Claims, 22 Drawing Sheets

(51) Int. Cl.
   *B60Q 3/04*     (2006.01)
   *F21V 8/00*     (2006.01)
   *G01D 13/26*    (2006.01)

(52) U.S. Cl.
   CPC ......... *G02B 6/0038* (2013.01); *G01D 13/265* (2013.01); *G02B 6/0066* (2013.01)

(58) Field of Classification Search
   CPC .... G02B 6/0028; G02B 5/045; G02B 6/0001; G02B 6/0055; G02B 27/2235; G02F 2001/133616; Y10S 385/901; B60Q 3/04; B60K 37/02
   USPC ........................................................ 359/462
   See application file for complete search history.

(56) References Cited

U.S. PATENT DOCUMENTS

| | | |
|---|---|---|
| 8,579,449 B2 | 11/2013 | Obata |
| 2013/0314891 A1 | 11/2013 | Miyazawa et al. |

\* cited by examiner

STEREOSCOPIC DISPLAY DEVICE AND DASHBOARD USING THE SAME

CROSS-REFERENCE TO RELATED APPLICATIONS

This application claims priority under 35 U.S.C. §119 to Korean Patent Application Nos. 10-2014-0012058, filed on Feb. 3, 2014 and 10-2014-0012574, filed on Feb. 4, 2014 whose entire disclosures are hereby incorporated by reference.

BACKGROUND

1. Field

Embodiments of the present disclosure relate to a lighting device using an LED (Light Emitting Diode), and more particularly, to a stereoscopic display device for displaying a line-shaped beam having a three-dimensional effect using an oriented incident beam, and a dashboard using the stereoscopic display device.

2. Background

An LED (Light emitting diode) is an element for converting an electrical signal into light using a compound semiconductor. It is advantageous in that a light source using the LED element has low power consumption, a high color temperature, a long lifespan and the like compared to a conventional light source.

One example of a conventional lighting device using an LED light source is disclosed in Korean Patent Laid-Open Publication No. 10-2012-0009209. The lighting device disclosed in the publication is an edge lighting type backlight unit in which a plurality of LED light sources is arranged at one side of a light guide plate, and is interposed between a reflective film and a light guide plate to diffuse light leaked upwards in left and right directions, thereby minimizing the deviation of luminous of a lighting plan.

However, the conventional art disclosed in the publication is disadvantageous in that there is a limit in making a thickness of the lighting device thin due to a thickness of the light guide plate used in the lighting device, it is difficult to apply the light guide plate to the lighting device or a display device because the light guide plate is not flexible, and a product design cannot be easily changed.

Also, most of conventional lighting devices using the LED light source, which are devices providing simple plan illumination, have not been developed as lighting devices having a new function such as an effect that the shape and the three-dimensional effect of light are changed according to each viewing angle. That is, in the recent mark for lighting devices, demand for a lighting produce having a new function has been considerably increasing in a competitive atmosphere of manufacturers. However, the manufacturers have not met this demand.

BRIEF DESCRIPTION OF THE DRAWINGS

The embodiments will be described in detail with reference to the following drawings in which like reference numerals refer to like elements wherein.

DETAILED DESCRIPTION

Figure 1:
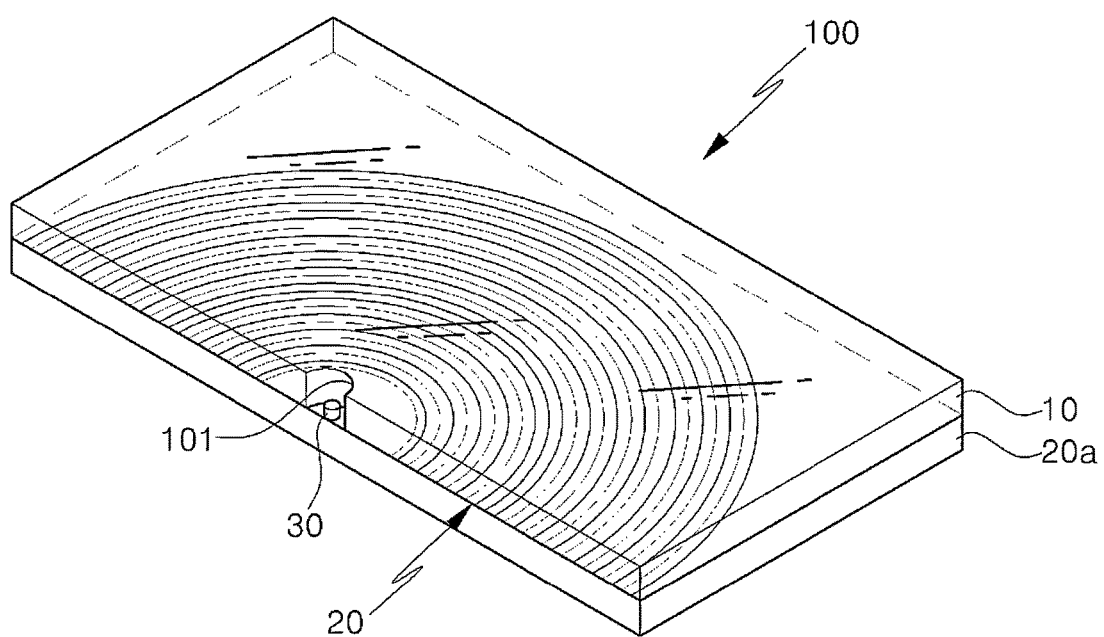
FIG. 1 is a perspective view showing a stereoscopic display device according to an embodiment of the present disclosure.

Hereinafter, the embodiments of the present disclosure that an ordinary person skilled in the art can implement will be described with reference to the accompanying drawings. The embodiments in the specification and the constructions shown in the drawings are provided as a preferred embodiment of the present disclosure, and it should be understood that there may be various equivalents and modifications which could substitute at the time of filing. In addition, when it comes to the operation principle of the preferred embodiments of the present disclosure, when the known functions or functions are seemed to make unclear the subject matters of the present disclosure, they will be omitted from the descriptions of the disclosure. The terms below are defined in consideration of the functions of the present disclosure, and the meaning of each term should be interpreted by judging the whole parts of the present specification, and the elements having the similar functions and operations of the drawings are given the same reference numerals. As used herein, the singular forms are intended to include the plural forms as well, unless the context clearly indicates otherwise.

Moreover, a stereoscopic display device according to the present disclosure is a device that can display stereo backgrounds or stereoscopic images. For example, the stereoscopic display device can be applied to a dashboard for a vehicle, and a dashboard for home or industrial equipment or the like.

Figure 2:
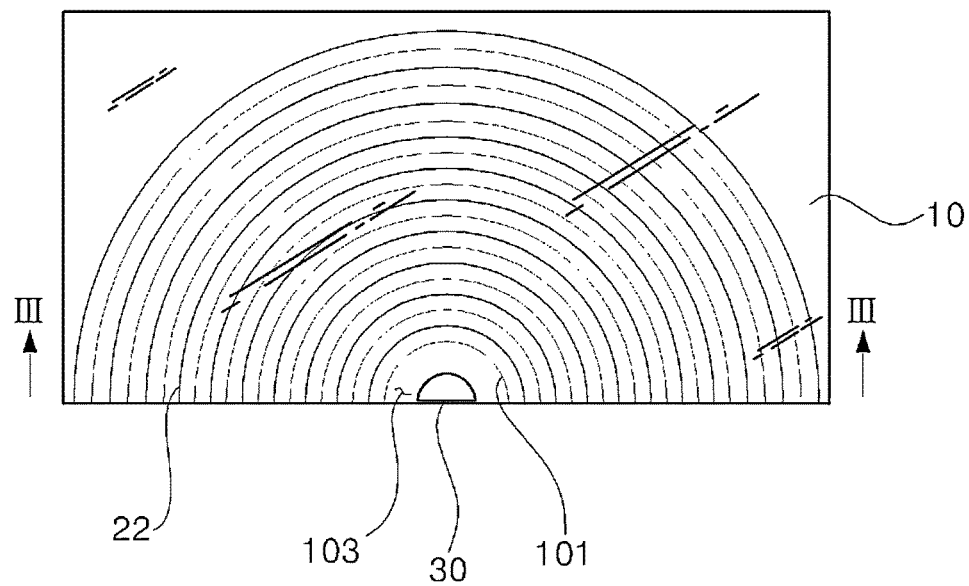
FIG. 2 is a plan view showing the stereoscopic display device of FIG. 1.

FIG. 1 is a perspective view showing a stereoscopic display device according to an embodiment of the present disclosure. FIG. 2 is a plan view showing the stereoscopic display device of FIG. 1.

Referring to FIGS. 1 and 2, a stereoscopic display device 100 according to the present embodiment includes a base substrate 10 and a three-dimensional effect forming portion 20. The base substrate 10 and the three-dimensional effect forming part 20 correspond to a display device or an optical plate that converts an incident beam into a line-shaped beam having a three-dimensional effect.

The base substrate 10 transmits the incident beam. The base substrate 10 enables the incident beam to be moved from one side to another side by internal reflection. The base substrate 10 may be provided in a plate or film form using glass, resin and the like. The base substrate 10 has a first surface and a second surface opposite to the first surface.

The three-dimensional effect forming part 20 has a pattern 22 formed by various concave parts and convex parts. The pattern 22 is configured such that pattern units having a semicircular shape are distributed in a radial form from the same center.

In the present embodiment, the three-dimensional effect forming part 20 is composed of a separate pattern layer 20a having one surface on which the pattern 22 is provided. The pattern layer 20a may be made of a thermoplastic resin, a thermosetting resin or a photocurable resin, and may be bonded to the second surface of the base substrate 10 by a condensing force or by an adhesive member.

Also, the stereoscopic display device 100 according to the present embodiment may further include a light source 30. The light source 30 irradiates an incident beam from a first side (hereinafter referred to as 'an incident surface') of the base substrate 10 to the inside of the based substrate 10. In the present embodiment, an incident surface 101 refers to a side that is concavely formed in a semicircular shape from one side of the base substrate.

A separation space 103 may be provided between the light source 30 and the incident surface 101. The separation space 103 may be installed to have only a minimum separation distance in consideration of rotation of the light source 30.

The light source 30 may be an LED package including at least one LED element. When the LED element is used, incident beams having various colors and a high straight property may be easily provided so that a line-shaped beam can be more effectively implemented.

In the present embodiment, the light source 30 is mounted to a printed circuit board providing a signal or driving power for controlling an operation of the LED element. In the present embodiment and most embodiments, for convenience of the description, it is assumed that the light source 30 includes the printed circuit board, and the printed circuit board is not separately illustrated.

Also, the stereoscopic display device 100 according to the present embodiment may further include a driving part (see reference numeral 170 of FIG. 8) intended for changing a light radiation direction of the light source 30 or rotating the light source 30. The driving part may be implemented by a motor and the like. When the driving part is used, line-shaped beams having different irradiation angles may be sequentially displayed on the pattern 22 having the semicircular or semielliptical shape via the single light source 30.

Figure 3:
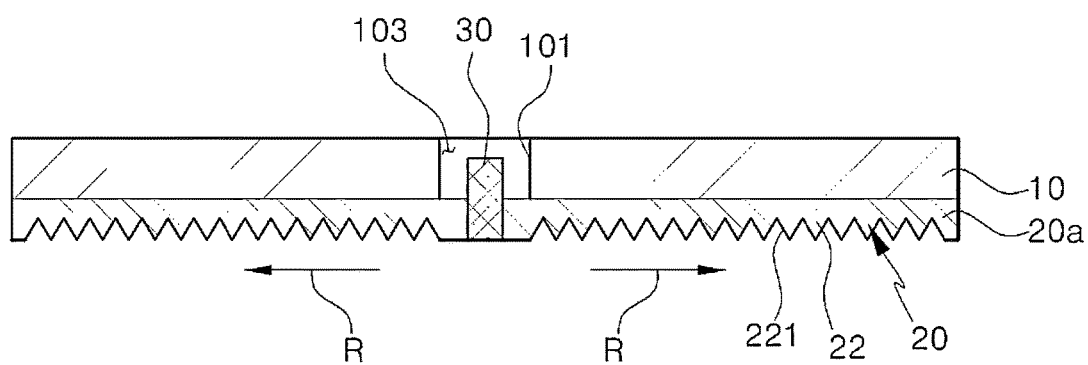
FIG. 3 is a cross-sectional view taken along line III-III of the stereoscopic display device of FIG. 2.

FIG. 3 is a cross-sectional view taken along line III-Ill of the stereoscopic display device of FIG. 2.

Referring to FIG. 3, when light irradiated from the light source 30 enters into the inside of the base substrate 10 via the incident surface 101, the incident beam is reflected from the inside of a laminate of the base substrate 10 and the pattern layer 20a and travels from a central portion of the patterns 22 arranged in a semicircular shape to an edge.

When the incident beam meets the patterns having an inclined surface 221, the pattern 22 guides the incident beam in a first surface direction toward which the first surface looks or a second surface direction toward which the second surface looks using refraction or reflection from the inclined surface 221, thereby implementing a line-shaped beam having a three-dimensional effect in a first path resulting from a pattern arrangement direction R. The first path is a special optical path of the incident beam.

According to the present embodiment, the stereoscopic display device, which can implement the incident beam of the LED light source as a line-shaped beam having a three-dimensional effect via a pattern design of the three-dimensional effect forming part, may be implemented. This stereoscopic display device may be usefully applied to a dashboard for a vehicle whose interior design is considered very meaningful. In the case of the dashboard, a line-shaped beam having a three-dimensional effect results from three-dimensionally implementing an indicator having a needle-like shape in the dashboard.

A line-shaped beam with a three-dimensional effect will be described in greater detail with reference to FIGS. 4 and 5.

Figure 4:
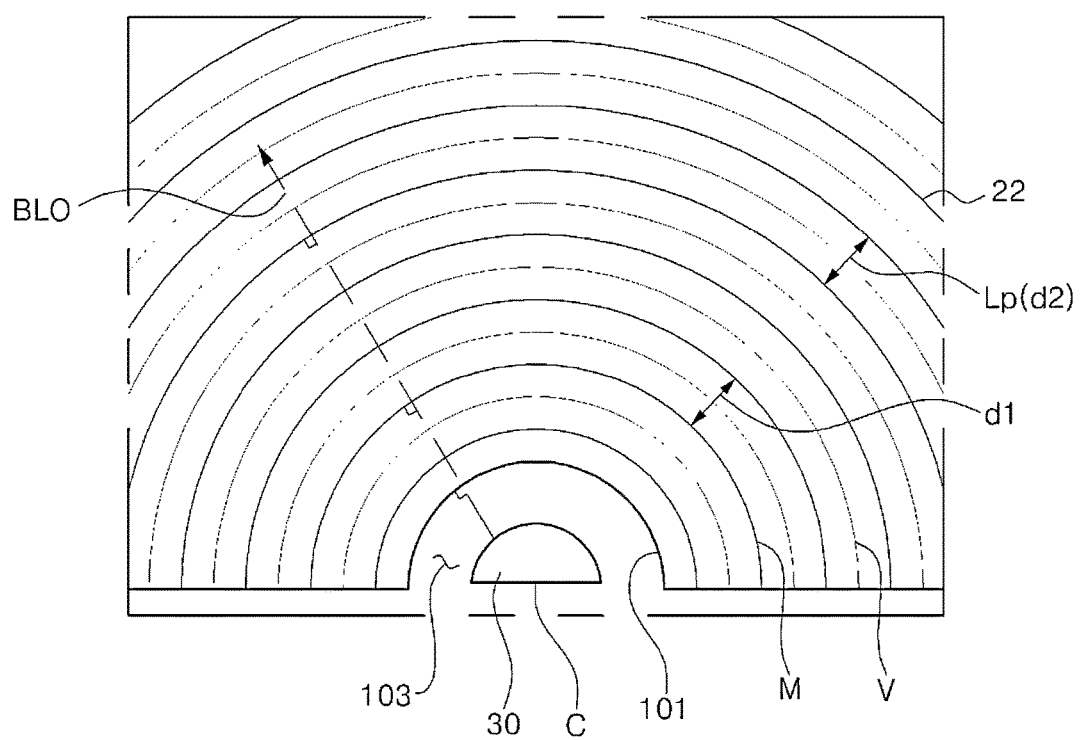
FIG. 4 is a partially enlarged plan view illustrated for explaining an operational principle of the stereoscopic display device of FIG. 1.

FIG. 4 is a partially enlarged plan view illustrated for explaining an operational principle of the stereoscopic display device of FIG. 1.

Referring to FIG. 4, according to the stereoscopic display device according to the present embodiment, the three-dimensional effect forming part 20 includes the pattern in which multiple pattern units having a semicircular or semielliptical shape are radially arranged from the same center. In such a pattern structure, the incident beam BL0 from the light source 30 is incident to the base substrate and passes through the pattern via an optical path that crosses at right angles to the incident surface 101.

At this time, the incident beam BL0 travels to a first path that crosses at right angles to respective pattern extension directions of the patterns units in which convex parts M extend in a ridge or mountain-like shape, or concave part V extend in a ditch or valley-like shape. This is because movement of the light is concentrated on an optical path of the pattern that can be traversed in the least time according to the Fermat's principle that 'a ray of light passing along a medium travels along a movement path that can be traversed in the least time.'

Also, when the incident beam meets the pattern, the pattern 22 guides the incident beam in the first surface direction or the second surface direction using reflection and refraction from the inclined surfaces of the pattern units, thereby emitting the incident beam to the outside of the stereoscopic display device. According to this emission beam, the user may see the line-shaped beam at the outside of the stereoscopic display device.

Figure 5:
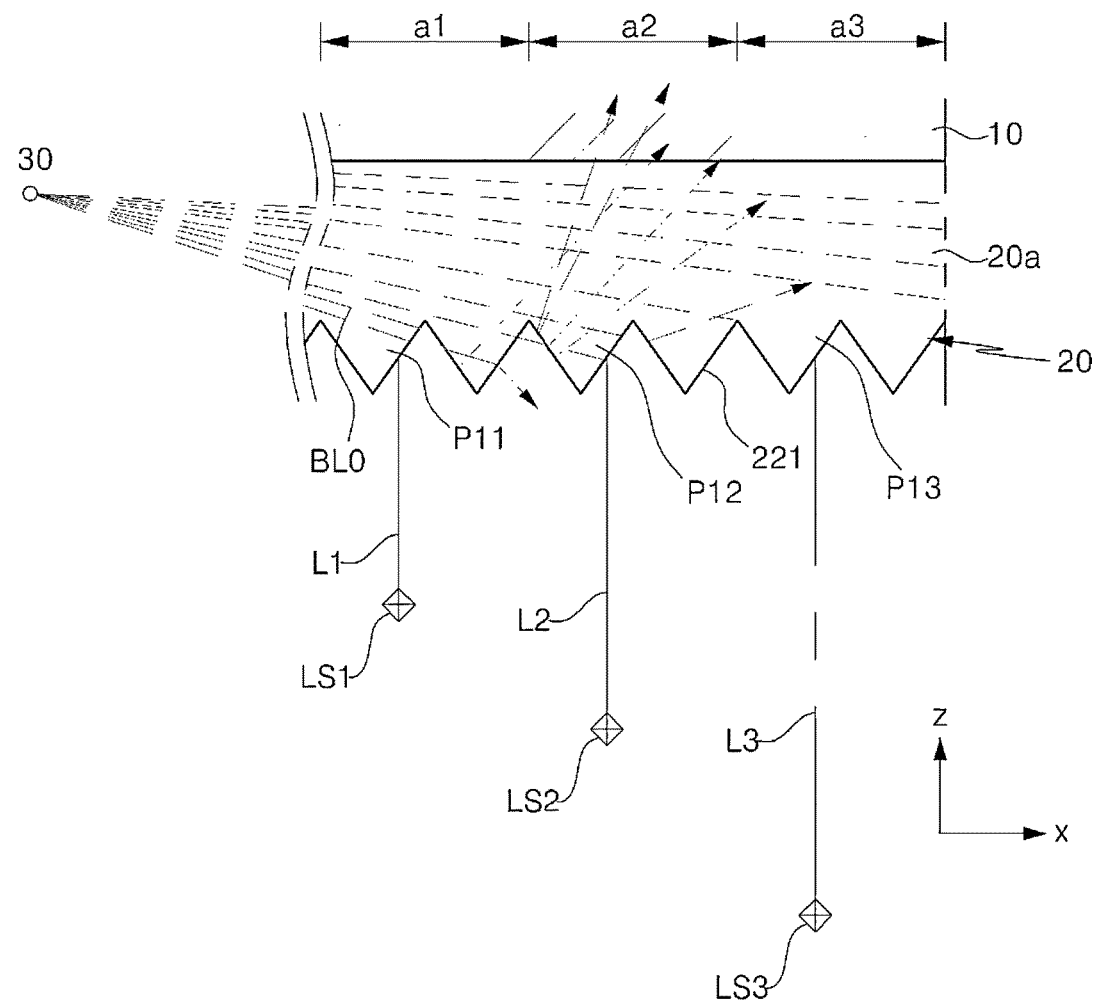
FIG. 5 is a partially enlarged cross-sectional view illustrated for explaining an operational principle of the stereoscopic display device of FIG. 1.

FIG. 5 is a partially enlarged cross-sectional view illustrated for explaining an operational principle of the stereoscopic display device of FIG. 1

Referring to FIG. 5, the incident beam BL0 moving in the inside of the base substrate 10 as the beam supplied from the light source 30 is reflected from the inside of the laminate of the base substrate and the pattern layer 21a at a critical angle or below determined by a refractive index of the base substrate 10 and a refractive index of an external medium (atmosphere) and travels from one side to another side.

When the incident beam BL0 meets the inclined surface 221 of the pattern 22, the incident beam BL0 is refracted or reflected from the inclined surface 221 and thus has an internal incidence angle which is larger than the critical angle. Then, the incident beam is emitted from the first surface direction (z direction) or the second surface direction (−z direction) to the outside of the laminate.

The patterns units of the pattern 22 function as indirect light sources emitting the incident beam in the first surface direction or the second surface direction by refracting or reflecting the incident beam using the inclined surface 221. Here, as viewed from a predetermined standard point of the outside of the stereoscopic display device, it seems that the indirect light sources formed by the respective patterns unit of the pattern 22 are located far away from the standard point gradually along a first path on the pattern.

In other words, the pattern units are sequentially arranged in a pattern arrangement direction (x-direction) based on the light source 30. Furthermore, when a first pattern unit P11 of a first area a1, a second pattern unit P12 of a second area a2, and a third pattern unit P13 of a third area a3 are arranged in order from a position near to the light source in the pattern arrangement direction, a second optical path of the incident beam from the light source 30 to the second pattern unit 12 is longer than a first optical path of the incident beam from the light source 30 to the first pattern unit P11 and is shorter than a third optical path of the incident beam from the light source 30 to the third pattern unit P13. That is, a second distance L2 between a second indirect light source LS2 and the second pattern unit P12 is longer than a first distance L1 between a first indirect light source LS1 and the first pattern unit P11 and is shorter than a third distance L3 between a third indirect light source LS3 and the third pattern unit P13. This means that the line-shaped beam has a perceptional depth effect (three-dimensional effect) inwardly concavely generated in the thickness direction of the base substrate by the indirect light sources located far away gradually from the standard point along the first path when viewed the standard point of the outside of the stereoscopic display device.

As described above, the multiple pattern units of the pattern 22 may be sequentially arranged along the first path of the line-shaped beam as viewed from a predetermined external standard point and may serve as indirect light sources located far away gradually from the standard point, thereby enabling the pattern 22 to implement a line-shaped beam having a three-dimensional effect in the first path.

The line-shaped beam having the three-dimensional effect refers to an optical image having a perceptional depth in which the line-shaped beam introduced to be limited to a specific optical width from the predetermined first path by a pattern design as viewed from the first surface direction or the second surface direction gradually enters from the first surface or the second surface of the base substrate 10 into the inside of the base substrate 10. The line-shaped beam having the three-dimensional effect may have a form in which luminous is gradually reduced along the first path.

Meanwhile, with regard to the first to third pattern units P11, P12 and P13, the second pattern unit P12 may be a pattern unit located right after the first pattern unit P11 on the second surface of the base substrate 10 as viewed from the light source 30 or may be a pattern unit located between the first pattern unit P11 and the other pattern units in a predetermined number. Similarly, the third pattern unit P13 may be a pattern unit located right after the second pattern unit P12 as viewed from the light source 30, or a pattern unit located between the second pattern unit P12 and the other pattern units in a predetermined number.

Figure 6:
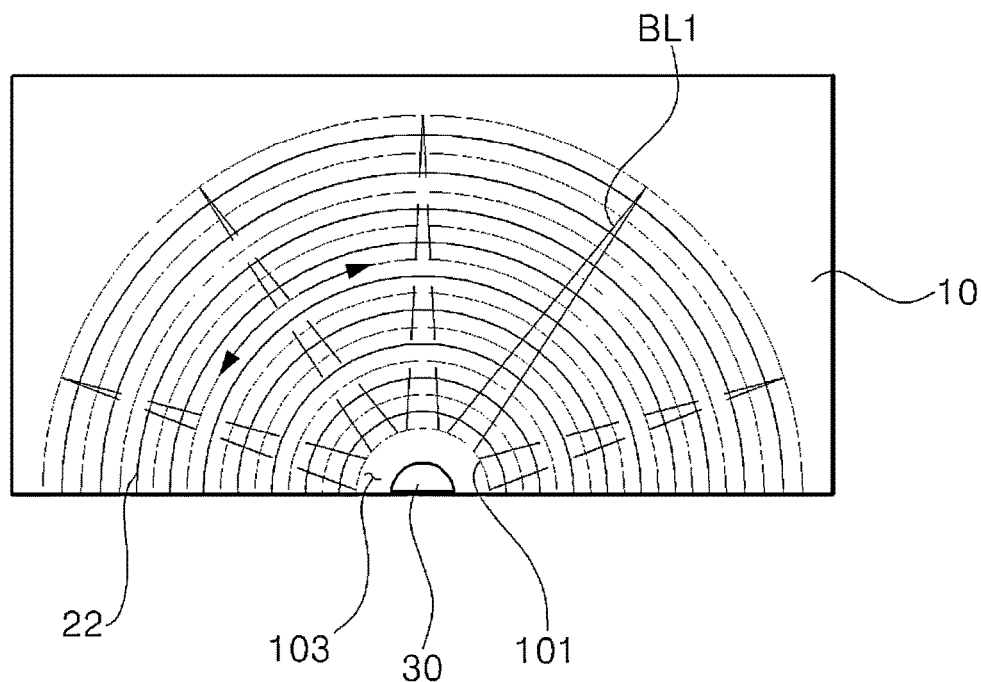
FIG. 6 is a plan view illustrated for explaining an operational principle of the stereoscopic display device of FIG. 1.

FIG. 6 is a plan view illustrated for explaining an operational principle of the stereoscopic display device of FIG. 1.

Referring to FIG. 6, when the dashboard is implemented using the stereoscopic display device according to the present embodiment, the incident beam from the light source 30 is converted into a line-shaped beam having a three-dimensional effect and is displayed on the pattern 22.

When the light source 30 is designed to be rotatable, namely, a predetermined driving part (reference numeral 170 of FIG. 8) is coupled to the lights source 30, the light source 30 is rotated by the driving part, a rotating line-shaped beam with a three-dimensional effect BL1 may be implemented on the pattern of the semicircular or semielliptical shape.

When the driving part is installed to rotate at a predetermined rotation angle according to a predetermined input signal or a control signal, the dashboard may be implemented a dashboard for various devices or a dashboard for a vehicle.

When the dashboard is implemented as a dashboard for a vehicle, the driving part may be a motor or an actuator that is connected to any one of various vehicle controllers mounted in a vehicle and is driven according to a control signal of the vehicle controller. The driving part may be operated by power of a vehicle battery.

Also, with regard to the dashboard, the light source 30 may be installed to be separable from the stereoscopic display device (in this case, the stereoscopic display device corresponds to an optical plate) including the laminate of the base substrate 10 and the three-dimensional effect forming part or the light guide part having the pattern 20, and may be disposed to irradiate light to the incident surface 101 having the semicircular shape or the semielliptical shape while performing a rotation motion. Like the driving part, the light source 30 may be connected to the vehicle controller or the vehicle battery.

Figure 7:
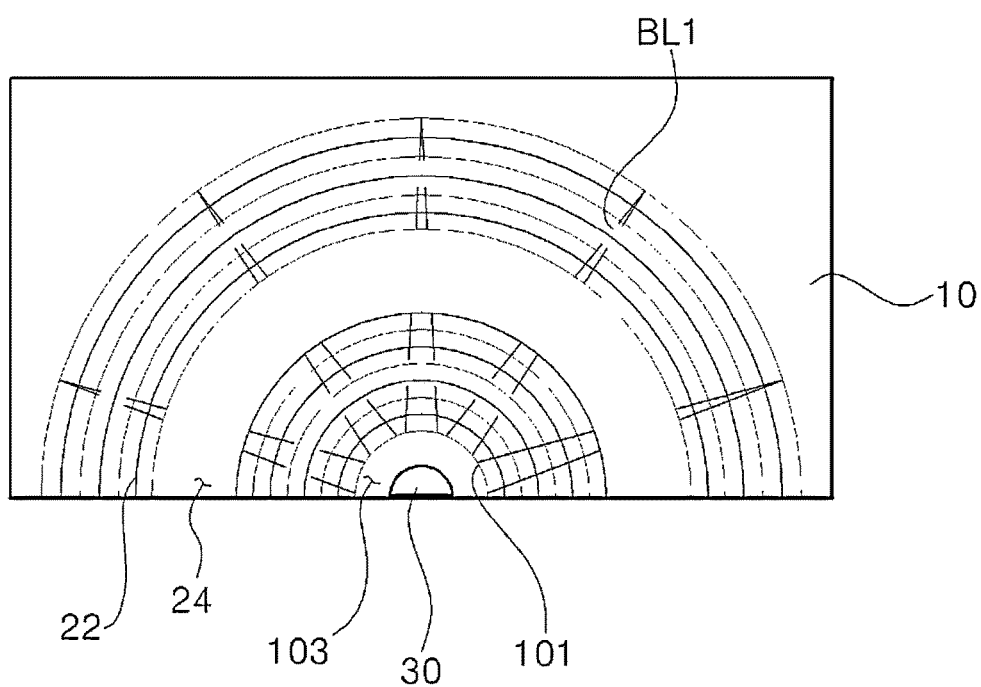
FIG. 7 is a plan view illustrated for explaining a modified example of the stereoscopic display device of FIG. 1.

FIG. 7 is a plan view illustrated for explaining a modified example of the stereoscopic display device of FIG. 1.

Referring to FIG. 7, the stereoscopic display device according to the present embodiment may be used in a dashboard. The stereoscopic display device may have a non-pattern forming part 24 in which some pattern units of the pattern 22 are not formed in a pattern arrangement direction.

The non-pattern forming part 24 enables a line-shaped beam to have a modified optical image by implementing a portion in which the line-shaped beam having a three-dimensional effect is disconnected. The non-pattern forming part 24 corresponds to a portion in which the pattern units having a convex or concave form are not provided on one surface of the patter layer bonded to the first surface of the base substrate 10 or on one surface of the light guide part corresponding to a single body thereof. The non-pattern forming part 24 may be parallel to the one surface described above or the first surface of the base substrate 10.

Meanwhile, a sign layer (not drawn) of a figure, a sign or the like may be provide on the second surface of the base substrate 10. The sign layer may overlap with the pattern 22 having the semicircular or semielliptical shape or may be provided to be located at the outer side of an edge of the pattern 22 by performing printing with an ink having a color.

According to the present embodiment, when the incident beam incident through the incident surface 101 from the light source 30 is converted into a line-shaped beam having a three-dimensional effect on the pattern 22, the line-shaped beam having a three-dimensional effect in a dotted line form may be implemented. Also, according to a rotation angle of the light source 30 connected to the driving part, the rotating line-shaped beam having a three-dimensional effect in a dotted line form BL1 may be implemented on the semicircular or semielliptical pattern 22.

Figure 8:
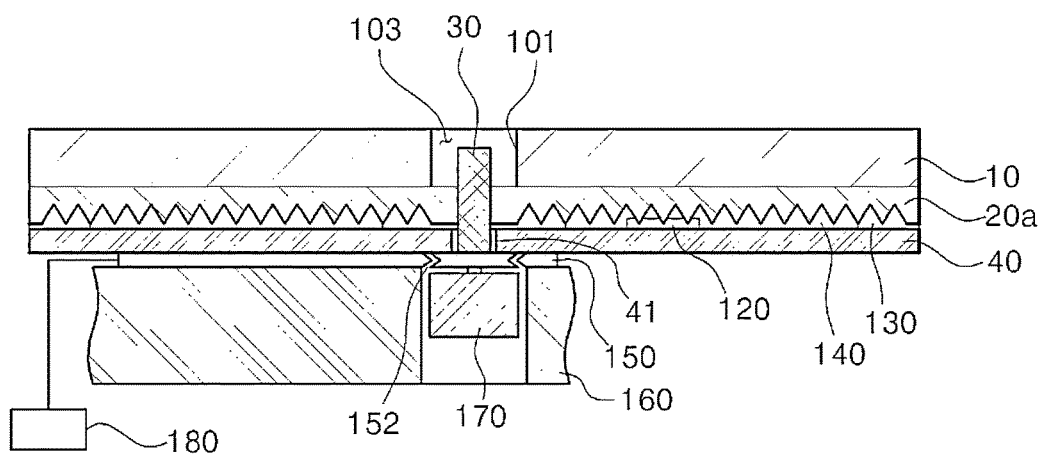
FIG. 8 is a cross-sectional view showing a stereoscopic display device according to another embodiment of the present disclosure.

FIG. 8 is a cross-sectional view showing a stereoscopic display device according to another embodiment of the present disclosure.

Referring to FIG. 8, the stereoscopic display device according to the embodiment includes: the base substrate 10; the pattern layer 20a forming the three-dimensional effect forming part by the patterns; the light source 30 and a reflective layer 40. Also, the stereoscopic display device may include a reflective pattern 120, an adhesive pattern 130 and a separation area 140 between the pattern layer 20a and the reflective layer 40. Also, the stereoscopic display device may include: a printed circuit board 150 to which the light source 30 is mounted; a support part 160 such as a frame for supporting the printed circuit board 150; a driving part 170 connected to a light source to rotate the light source; and a power supply part supplying power to the light source 30 via the printed circuit board.

The reflective layer 40 is disposed between the printed circuit board 150 and the pattern layer 20a. The reflective layer 40 is made of a material having high reflection efficiency and reflects light emitted by passing through the pattern layer 20a to return the light from the pattern layer 20a again. When the reflective layer 40 is used, optical loss of the stereoscopic display device can be reduced, and a line-shaped beam having a three-dimensional effect may be more clearly expressed.

A synthetic resin in which a white pigment is diffused and contained may be used as a material of the reflective layer 40. Titanium oxide, aluminum oxide, zinc oxide, lead carbonate, barium sulfate, calcium carbonate and the like may be used as the white pigment. Polyethylene terephthalate, polyethylene naphthenate, acryl resin, poly carbonate, polystyrene, polyolefin, cellulose acetate, weather resistant vinyl chloride and the like may be used as a raw material of the synthetic resin, but the present disclosure is not limited thereto. Also, according to some embodiments, the reflective layer 40 may be made of Ag, Al, stainless steel (304SS) and the like.

In order to control reflection efficiency and a reflection area of the reflective layer 40, the reflective pattern 120 may be provided on the reflective layer 40. The reflective pattern 120 may be implemented by a pattern printed on one surface of the reflective layer 40 with an ink material. The reflective pattern 120 may have a form in which pattern units having a hexagonal shape are arranged in a hive-like shape.

A material of the reflective layer 40 may be used as a material of the reflective pattern 120, but the material is not limited to thereto. $TiO_2$, $CaCO_3$, $BaSO_4$, $Al_2O_3$, Silicon, PS (Poly Styrene) and the like may be used as the material of the reflective pattern 120.

In the present embodiment, the pattern layer 20a is arranged so that the pattern of the three-dimensional effect forming part can face the reflective layer 40. The arrangement is intended to prevent the pattern covered by the resin layer from the loss of its own special function (reflection or refraction function) caused by the resin layer when the base substrate 10 is formed by applying the resin layer to the pattern layer 20a. That is, the pattern should function to guide the incident beam to the outside of the device by refracting and reflecting the incident beam from the inclined surface. When the pattern is covered by a resin layer having a similar refractive index to that of the pattern layer 20a, the inclined surface of the pattern substantially disappears, so the pattern cannot perform its function. However, in the present embodiment, the pattern layer 20a is disposed to face the reflective layer 40 rather than facing the first surface of the base substrate 10 so that the problem of the pattern can be prevented from being generated.

When the pattern layer 20a and the reflective layer 40 are disposed to be laminated, the adhesive pattern 130 may be used. In such a case, the adhesive pattern 130 may have a predetermined pattern (a hive-like shape and the like) and may be used so as to limit reflectivity or a reflection area of the reflective layer 40. The adhesive pattern 130 may be integrally implemented by the reflective pattern 120 containing an adhesive material according to some embodiments.

Also, when the pattern layer 20a and the reflective layer 40 are disposed to be laminated, the separation area 140 may be formed between the pattern layer 20a and the reflective layer 40 by the pattern of the pattern layer 20a or the adhesive pattern 130 between the pattern and the adjacent pattern. The separation area may not be formed by entirely disposing the adhesive pattern 130 on the pattern arrangement surface of the pattern layer 20a. On the contrary, when the separation area 140 is formed, the separation area 140 may function to guide minute scattering of the line-shape beam having the three-dimensional effect or surrounding beams thereof so that the line-shape beam having the three-dimensional effect can express optical images having different feelings. The separation area 140 may be an air layer or a vacuum layer.

The printed circuit board 150 is connected to the light source 30 to supply power or a driving signal to the light source 30. The printed circuit board 150 may include a rigid or flexible type printed circuit board. The light source 30 mounted to the printed circuit board 150 may be disposed on the incident surface 101 of the base substrate 10 via an opening 41 of the reflective layer 40 and an opening of the pattern layer 20a.

The support part 160 may be provided so as to support the base substrate 10, the reflective layer 40, the driving part 170 and the like as well as the printed circuit board 150. The support part 160 may be made of a metallic material such as stainless steel and the like.

The driving part 170 may be connected to the light source 30 to rotate the light source, or may be disposed in front of a light emitting surface of the light source 30 so that a radiation direction of the emission beam of the light source 30 can be freely changed in a semicircle or a semi-ellipse. When the driving part rotates the light source, the driving 170 may be implemented so as to rotate a printed circuit board (a first printed circuit board part) to which the light source 30 is mounted. In such a case, the first printed circuit board part may be connected to the remaining printed circuit board (a second printed circuit board part) via a separate wiring (not drawn) or a sliding wiring structure so as to perform a reciprocating rotation motion in the semicircle or the semi-ellipse or to enable the transmission of power of a signal The power supply part 180 is connected to the light source 30 or the driving part 170 to supply power. The power supply part 180 may include commonly used power connected via a wiring, a connector and the like. However, according to some embodiments, the power supply part may be provided as a vehicle battery. When the power supply part is provided as the vehicle battery, the light source 30 or the driving part 170 is connected to the vehicle battery and is driven by the power of the vehicle battery.

According to the present embodiment, when a line-shaped beam having a three-dimensional effect is implemented by a pattern design, the stereoscopic display device capable of providing a change to an optical image using the reflective pattern 120, the adhesive pattern or the separation area 140 may be provided. This stereoscopic display device may be effectively applied to an application such as various display devices or lighting devices for a vehicle dashboard and the like.

Figure 9:
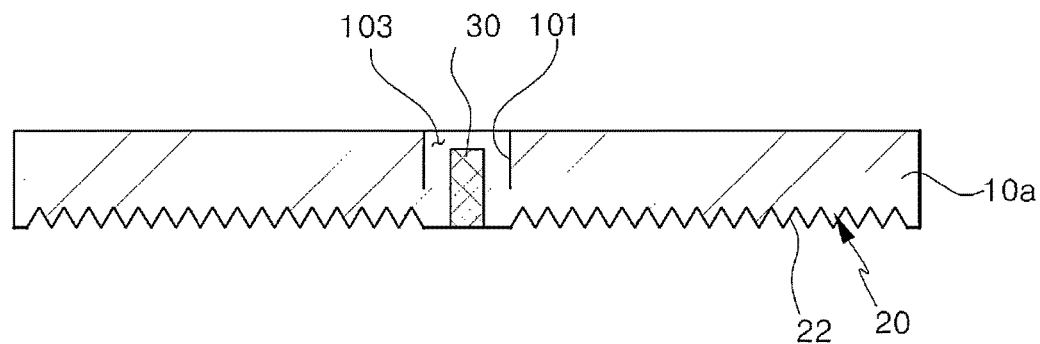
FIG. 9 is a cross-sectional view showing a stereoscopic display device according to a further embodiment of the present disclosure.

FIG. 9 is a cross-sectional view showing a stereoscopic display device according to a further embodiment of the present disclosure.

Referring to FIG. 9, the stereoscopic display device according to the present embodiment includes: a light guide part 10a; the pattern 22 provided on a first surface of the light guide part 10a; and the light source 30 disposed at a central portion of the pattern 22 having a semicircular or semielliptical shape to irradiate an incident beam to an edge. The pattern 22 constitutes the three-dimensional effect forming part 20.

The light guide part 10a implements, as a single member, the laminate of the base substrate and the pattern layer of the stereoscopic display device of FIG. 8. In the present embodiment, the light guide part 10a performs substantially the same function as that of the laminate of the base substrate and the pattern layer. Glass, resin and the like may be used as the material of the light guide part 10a, but the material is not limited thereto. However, the light guide part is made of a resin having a predetermined thickness, the light guide part 10a may have flexibility to the extent that the light guide part can be wound around a roll having a predetermined curvature.

According to the present embodiment, when the light guide part 10a is formed as a resin layer, the printed circuit board is provided as a flexible printed circuit board, a flexible stereoscopic display device, which is bendable with a predetermined curvature, may be implemented.

Meanwhile, by forming the base substrate and the pattern layer instead of the light guide part as the resin layer, the flexible stereoscopic display device may be also implemented. The laminate of the base substrate and the pattern layer, or the light guide part may have a thickness (about 250 μm or less) suitable for implementation of the flexible stereoscopic display device, and the base substrate and the pattern layer may be made of the same material or different materials.

Figure 10:
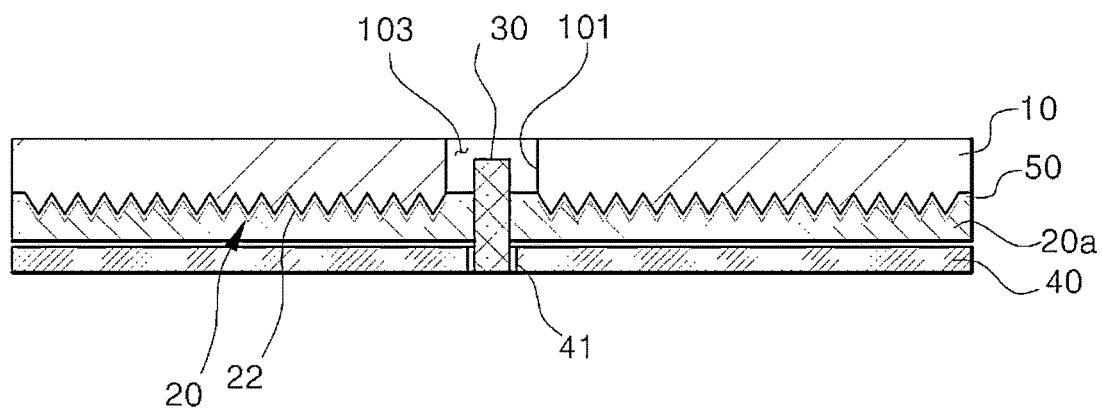
FIG. 10 is a cross-sectional view showing a stereoscopic display device according to yet another embodiment of the present disclosure.

FIG. 10 is a cross-sectional view showing a stereoscopic display device according to yet another embodiment of the present disclosure.

Referring to FIG. 10, the stereoscopic display device according to the present embodiment includes: the base substrate 10; the pattern layer 20a; the light source 30; the reflective layer 40; and a separation layer 50.

The stereoscopic display device according to the present embodiment may be substantially identical to the stereoscopic display device of the embodiment previously described with reference to FIG. 8 except for the arrangement direction of the pattern layer 20a and the separation layer 50.

In the present embodiment, the pattern layer 20a is disposed so that the pattern 22 of the three-dimensional effect forming part 20 can be buried by the resin layer that forms the base substrate 10. In such a case, when a refractive index between the pattern layer 20a and the resin layer is small, a reflection or refraction function of the pattern 22 may be nearly lost. In order to prevent this problem, in the present embodiment, the separation layer 50 is disposed between the pattern 22 of the pattern layer 20a and the base substrate 10.

In other words, when a difference between a refractive index of the base substrate 10 and a refractive index of the pattern layer 20a is 0.2 or less, the inclined surface of the pattern 22 located between the base substrate and the pattern layer fails to properly perform the refractive or reflex action of an incident beam. In such a case, it is difficult to implement a line-shaped beam having a three-dimensional effect because the pattern 22 of the three-dimensional effect forming part 20 cannot guide the incident beam of the light source 30 to the outside of the device. Accordingly, in the stereoscopic display device according to the present embodiment, the separation layer 50 is formed between the pattern 22 and the base substrate, and thus the base substrate 10 formed with the resin layer and the pattern 22 are clearly separated so that the reflective and refractive motions of the incident beam from the inclined surface of the pattern 22 can be smoothly performed.

The separation layer 50 may be a metallic coating layer disposed between the base substrate 10 and the pattern layer 20a so that a difference in a refractive index between the base substrate and the pattern layer can be prevented from being less than a predetermined value According to the present embodiment, the pattern 22 of the three-dimensional effect forming part 20 may be disposed at the base substrate composed of the resin layer or at the inside of the light guide part.

Figure 11:
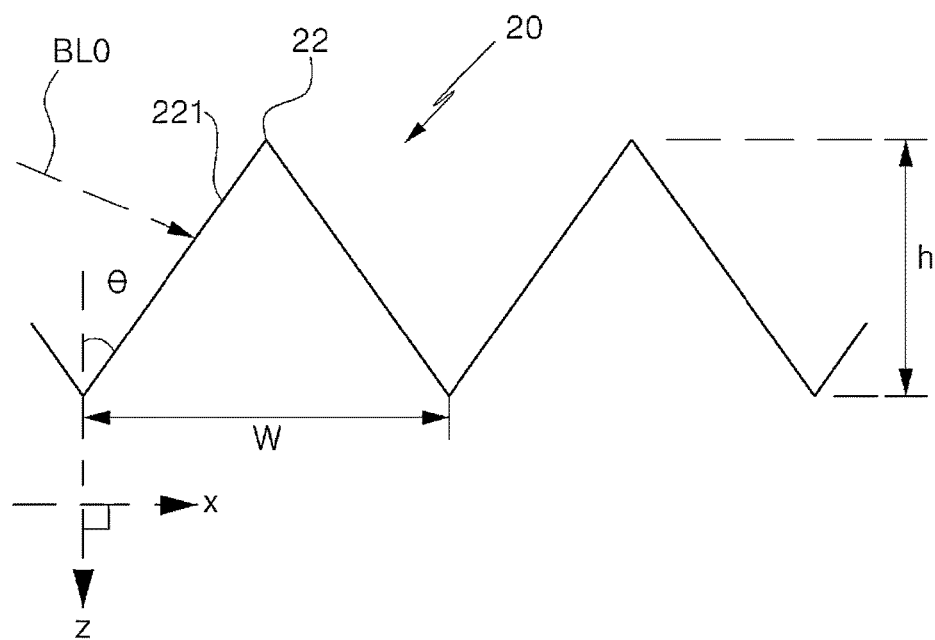
FIGS. 11 to 13 are exemplary views for a pattern of a three-dimensional forming part that can be applied to the stereoscopic display device of FIG. 1.
Figure 12:
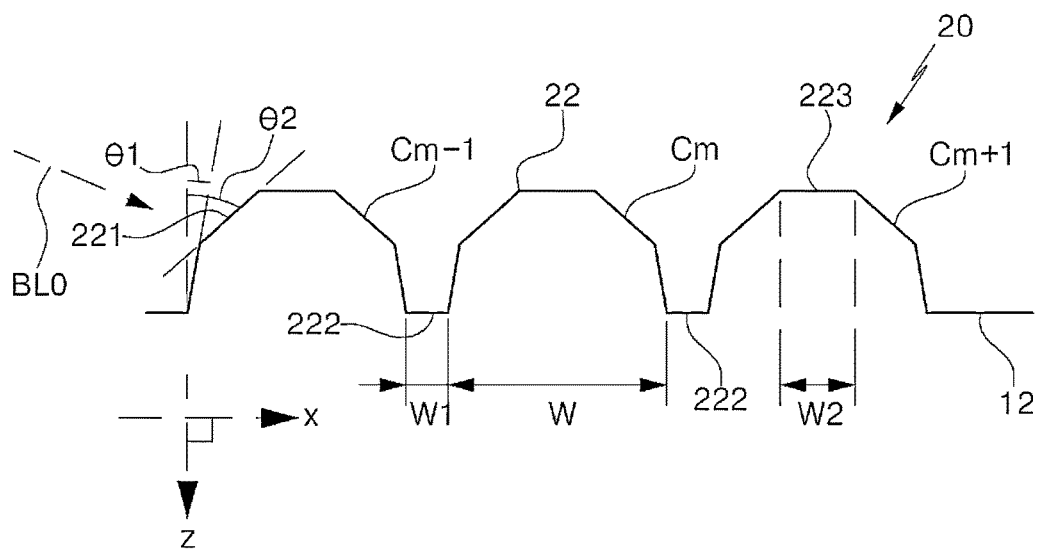
Figure 13:
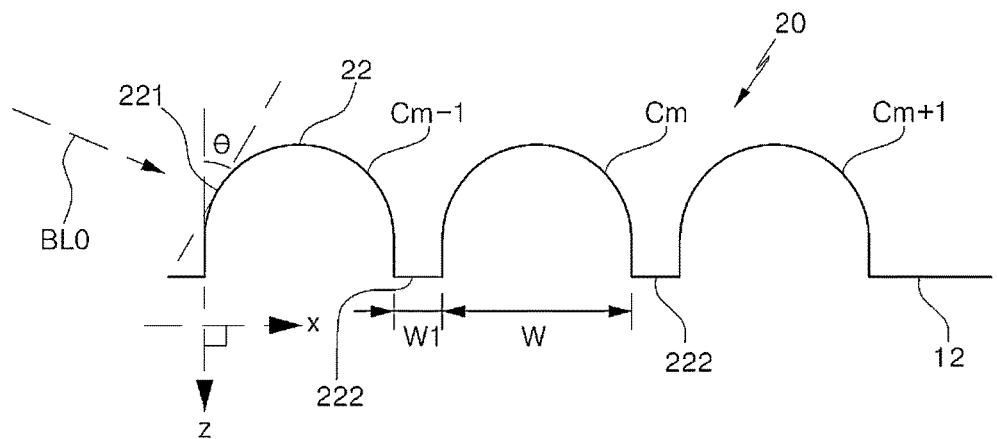

FIGS. 11 to 13 are exemplary views for a pattern of a three-dimensional forming part that can be applied to the stereoscopic display device of FIG. 1.

Referring to FIG. 11, the pattern 22 of the three-dimensional effect forming part 20 according to the present embodiment has a pattern structure in a prism or triangular cross section form. When the pattern 22 has the prism form, the inclined surface 221 of the pattern 22 has a predetermined inclination angle with respect to a pattern arrangement surface extending to an x-direction. That is, the inclined surface 221 may be designed to be inclined at a predetermined inclination angle θ with respect to a direction (z-direction) that crosses at right angles to the pattern layer or the first surface 12 of the light guide part. In the laminate of a pattern layer with the light guide part with regard to the first surface 12 or the base substrate, the pattern layer is briefly referred to as the light guide part.

The inclination angle θ of the inclined surface 221 may be about 5° to 85°. The inclination angle θ may be limited in consideration of a refractive index of the light guide part. However, in consideration of a minimum or maximum angle capable of enabling reflection and refraction from the inclined surface to be property performed, the inclination angle θ may basically range from 5° to 85°.

As one example, when the refractive index of the light guide part ranges from about 1.30 to 1.80, an inclination angle of the inclined surface 221 may be larger than 33.7° and smaller than 50.3°, or may be larger than 49.7° and smaller than 56.3° according to a standard direction (z-direction or y-direction).

Also, according some embodiments, the light guide part may be made of a material having a high refractive index. For example, in the case of manufacturing high intensity LEDs, when a ray of light having a specific incidence angle penetrates a capsule material by passing along a die, total internal reflection is generated due to a difference in an n value (a refractive index) between the die (n=2.50~3.50) and a general polymeric capsule material (n=1.40~1.60), and accordingly, light extraction efficiency of the device is reduced. Thus, in order to properly solve this problem, a high refractive index polymer (n=1.80~2.50) is used. In the present embodiment, the light guide portion or the main patterns 22 may be provided by utilizing the high refractive index polymer (n=1.80~2.50) used in manufacturing high intensity LEDs. In this case, the inclination angle of the inclined surface 221 of the pattern 22 may be larger than 23.6° and smaller than about 56.3° according to a refractive index of the light guide part.

The inclination angle according to the refractive index may be represented by following Equation 1 according to the Snell's law.

$$\frac{\sin\theta_1}{\sin\theta_2} = \frac{n2}{n1} \quad \text{[Equation 1]}$$

In Equation 1, sin θ1 is an incidence angle or a refraction angle of light shown in a first medium having a first refractive index n1, and sin θ2 is a refraction angle or an incidence angle of light shown in a second medium having a second refractive index n2.

As previously described, with regard to the light guide part of the stereoscopic display device according to the present embodiment, the inclined surface of the pattern of the three-dimensional effect forming part may be provided to have an inclination angle θ ranging from about 5° to about 85° as an inclination angle which enables an incident beam to be reflected or refracted appropriately.

Also, according to the present embodiment, a ratio of the width w to the height h between the adjacent pattern units of the pattern 22 may be limited to a predetermined ratio. The width w may be a predetermined distance between two adjacent pattern units, namely, a pitch. For example, when the pattern is designed so as to emphasize a perceptional depth effect of a line-shaped beam, the width w may be provided to be equal to or smaller than the height h. Also, when the pattern is designed so that relatively long images can be expressed by the line-shaped beam, the width w of the pattern may be provided to be larger than the height h.

When the ratio h/w of a width to a height of the pattern 22 is smaller than 1, the concave part has a lower depth compared to a case in which the ratio h/w of the width to the height of the pattern 22 is 1 or more, so that the pattern can be easily manufactured.

A width w of the pattern 22 may be about 10 to 500 μm This width w may be an average distance between two adjacent pattern units in the x-direction and may be adjusted according to a pattern design, an arrangement structure or a desired optical image shape.

According to the present embodiment, by using a width w and a height h of the pattern 22 as a factor for adjusting properties, the pattern 22 is designed so that various optical images resulting from the line-shaped beam having the three-dimensional effect targeted to be implemented can be efficiently and easily controlled.

Referring to FIG. 12, with regard to the optical member according to the present embodiment, the pattern 22 of the three-dimensional effect forming part 20 has a pattern structure in a polygonal cross section form. That is, the inclined surface 221 of the pattern 22 has a broken-line graph form.

The inclined surface 221 of the pattern 22 may have multiple inclination angles θ1, θ2 according to the number of segments of a broken-line graph in a direction (z-direction) crossing at right angles to a thickness direction of the light guide part or the first surface 12 of the light guide part. The second inclination angle θ2 may be larger than the first inclination angle θ1. The first or second inclination angles θ1, θ2 may be designed within the range which is larger than about 5° and smaller than about 85°.

The three-dimensional effect forming part 20 of the present embodiment may include the separation part 222 provided between two adjacent pattern units. For example, when the pattern 22 includes: a first pattern unit Cm−1; a second pattern unit Cm; and a third pattern unit Cm+1 (where, m is an natural number of 2 or more), the three-dimensional effect forming part 20 may include the separation part 222 provided between the first pattern unit Cm−1 and the second pattern unit Cm, and between the second pattern unit Cm and the third pattern unit Cm+1.

A width w1 of the separation part 222 is smaller than a width w of the pattern 22. In order for the three-dimensional effect forming part 20 to implement a natural line-shaped beam, the separation part 22 may be designed to have the width w1 of several μm or less or the width of about ⅕ or less of the width w of the pattern.

Also, the three-dimensional effect forming portion 20 of the present embodiment may have an interrupted surface 223, which is almost parallel to the first surface 12, on the patterns 22. The interrupted surface 223 is a part which does not function to enable light to be substantially emitted to the outside through the reflection or refraction of the incident beam. Thus, since the line-shaped beam implemented by the pattern 22 may have an interrupted part corresponding to the interrupted surface 223, a width w2 of the interrupted surface 223 may be appropriately designed in a range of several μm or less in order to implement a line-shaped beam having a desired shape.

Referring to FIG. 13, according to the stereoscopic display device of the present embodiment, the pattern of the three-dimensional effect forming part 20 has a lenticular form, a semi-circular cross section form or a semielliptical cross section form. The pattern 22 has the inclined surface inclined at a predetermined angle in a thickness direction (z-direction) of the light guide part or a direction (z-direction) which crosses at right angles to the first surface 12 of the light guide part. The pattern 22 may have a symmetrical form based on a pattern center line (not drawn) in the z-direction.

Due to the semi-circular structure, the inclined surface of the pattern 22 may have a structure in which a position on the inclined surface meeting the incident beam BL is changed according to an incident position of the incident beam BL0. That is, since the inclined surface 221 of the pattern 22 of the present embodiment is a surface in contact with an arbitrary point in a circular arc form, a tangent line in contact with the arbitrary point on the pattern 22 may be placed at a fixed inclination angle θ in the direction (the z-direction) crossing at right angles to the first surface 12 of the light guide part. The inclination angle θ may be larger than 0° and smaller than 90° according to each position of the inclined surface which the beam BL strikes.

In the present embodiment, the pattern 22 of the three-dimensional effect forming part 20 may further include the separation part 222 provided between two adjacent patterns. The separation part 222 may be a non-pattern forming part between two adjacent pattern units that are inwardly concavely formed from the first surface 12 of the pattern layer or the light guide part and may extend parallel to the first surface 12 as a part of the first surface 12. The formation of the separation part 222 corresponding to a gap between the pattern units provided for convenience of a pattern design or a production process may be omitted according to a material of the light guide part, the production process or the pattern design.

Meanwhile, when the separation portion 222 is disposed, a width w1 of the separation part 222 is designed to be smaller than a width w of the pattern units of the pattern 22. The width w1 of the separation part 222 is may be about ⅕ or less or several μm or less of the width w of the pattern 22. When the width w1 of the separation part 222 is greater than the width w of the pattern 22, the pattern 22 may implement the line-shaped beam having an interrupted part.

In particular, when the pattern 22 has a lenticular form, the pattern may be designed such that a rate (h/w) of a width (or a diameter) to a height of the pattern 22 is about ½ or less, or an inclination angle θ of the inclined surface is about 60° or less, thereby easily implementing a line-shaped beam.

Meanwhile, in the aforesaid embodiments, based on a case in which the cross section of each pattern has a triangular shape, a polygonal shape or a semicircular shape, the description has been performed, but the present disclosure is not limited to this configuration. If the pattern has a structure in which light traveling to the inside of the light guide part is refracted or reflected and is emitted in the first surface direction or the second surface direction, in addition to the cross section having a straight lined shape, a curve shape, and a broken-line graph-like shape, the cross section of the pattern may have a combination of these shapes or the other shapes.

Figure 14:
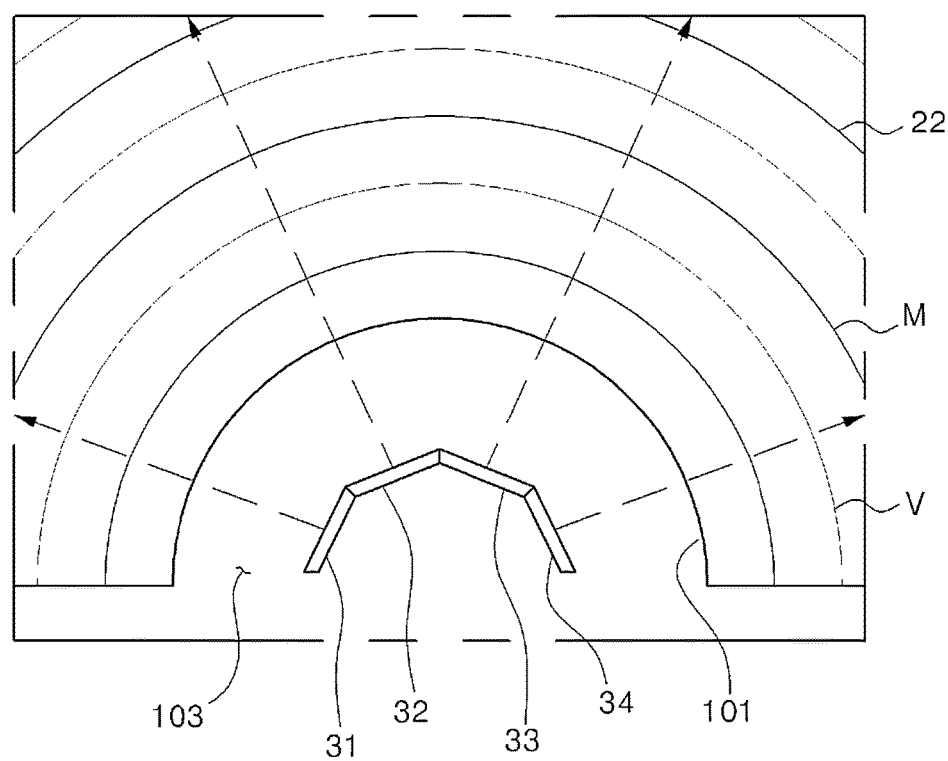
FIG. 14 is a partially enlarged plan view showing a stereoscopic display device according to still another embodiment of the present disclosure.

FIG. 14 is a partially enlarged plan view showing a stereoscopic display device according to still another embodiment of the present disclosure.

Referring to FIG. 14, the stereoscopic display device according to the present embodiment includes the light guide part having the first surface on which the pattern 22 is provided, and a plurality of light sources 31, 32, 33, 34.

The pattern 22 includes semicircular pattern units radially diffused from the same center and arranged in a wave-like shape. The pattern units have a form in which convex parts M or concave parts V extend in a semicircular arc.

The light source has a first light source 31, a second light source 32, a third light source 33 and a fourth light source 34 arranged at a central portion of the pattern 22. The first to fourth light sources are arranged to irradiate light from the central portion of the pattern 22 in different radial directions. The first to fourth light sources correspond to sub-light sources of the light source.

The first to fourth light sources may be connected to a controller via a predetermined wiring and a connector. In this case, the first to fourth light sources may be selectively turned on in response to a control signal of the controller. In this structure, the driving part (see reference numeral 170 of FIG. 8) for rotating the light source or changing an optical path of the light source may be omitted.

When the first to forth light sources 31 to 34 are selectively controlled by a control part, the stereoscopic display device may be easily applied to an application such as a dashboard. The dashboard may be a dashboard for a vehicle. In such a case, the control part is a partial function part of vehicle controllers or a partial constitution part that performs a function corresponding to the function part.

According to the present embodiment, a line-shaped beam having a three-dimensional effect serving as an indicator having a needle-like shape may be implemented on the radial pattern using the plurality of sub-light sources.

Figure 15:
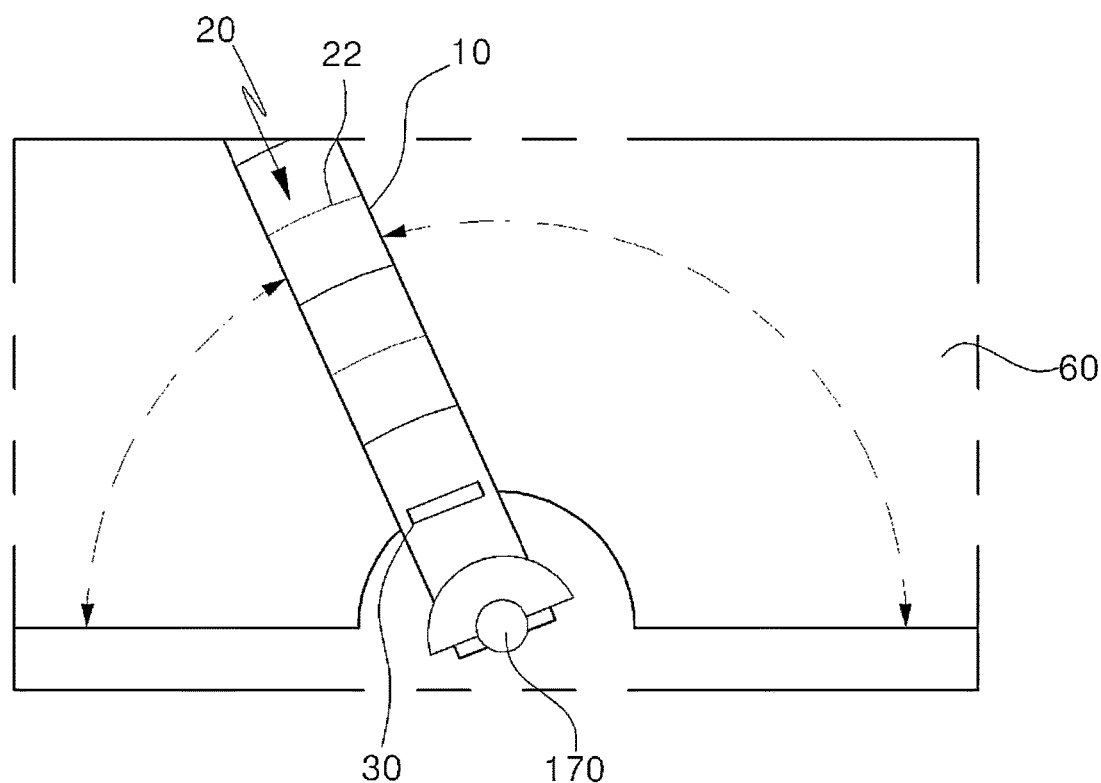
FIG. 15 is a partially enlarged plan view showing a stereoscopic display device according to still another embodiment of the present disclosure.
Figure 16:
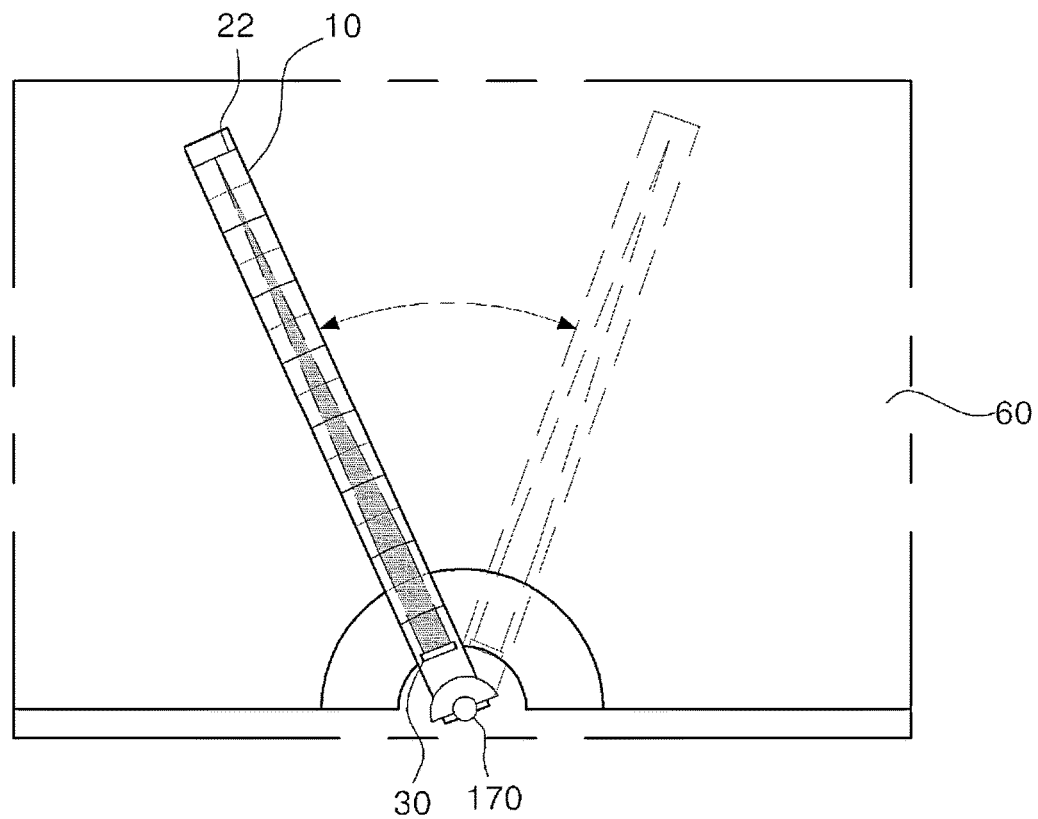
FIG. 16 is a partially plan view illustrated for explaining an operational principle of the stereoscopic display device of FIG. 15.

FIG. 15 is a partially enlarged plan view showing a stereoscopic display device according to still another embodiment of the present disclosure. FIG. 16 is a partially plan view illustrated for explaining an operational principle of the stereoscopic display device of FIG. 15

Referring to FIG. 15, the stereoscopic display device according to the present embodiment includes: the base substrate 10; the three-dimensional effect forming part 20 provided on the first surface of the base substrate 10; the light source 30; and the driving part 170.

The base substrate 10 has a first surface and a second surface opposite to the first surface and has a side with a predetermined thickness between the first and second surfaces, having a needle or long rod-like shape. The base substrate 10 has a light transmitting property for transmitting an incident beam. The base substrate 10 may perform a reciprocating motion with a needle of the dashboard in the printing part 60 having a dashboard-like shape arranged at a lower portion.

The three-dimensional effect forming part 20 has the pattern 22. The pattern 22 has a plurality of pattern units arranged in a first direction, and the pattern units have respective inclined surfaces having an inclination angle with respect to the first surface.

When the incident beam is incident to the central part of the pattern and travels to the inside of the base substrate 10, the pattern 22 guides the incident beam to the first surface direction or the second surface direction by refraction or reflection from the inclined surface of the pattern, thereby displaying a line-shaped beam having a three-dimensional effect in the first path resulting from a pattern arrangement direction.

The light source 30 is disposed at one end of the pattern 22 on the base substrate 10. The light source 30 is supported by the base substrate 10.

The driving part 170 is coupled to the base substrate 10 and rotates the base substrate 10 in a semicircular or a semielliptical shape based on one end of the base substrate on which the light source 30 is arranged. The driving part 170 is coupled to the vehicle controller 190 so that the base member 10 can be rotated at a predetermined rotating angle resulting from a vehicle speed.

As illustrated in FIG. 16, the stereoscopic display device according to the present embodiment may display a line-shaped beam having a three-dimensional effect while performing a rotationally reciprocating motion with the indicator having a needle-like shape.

Figure 17:
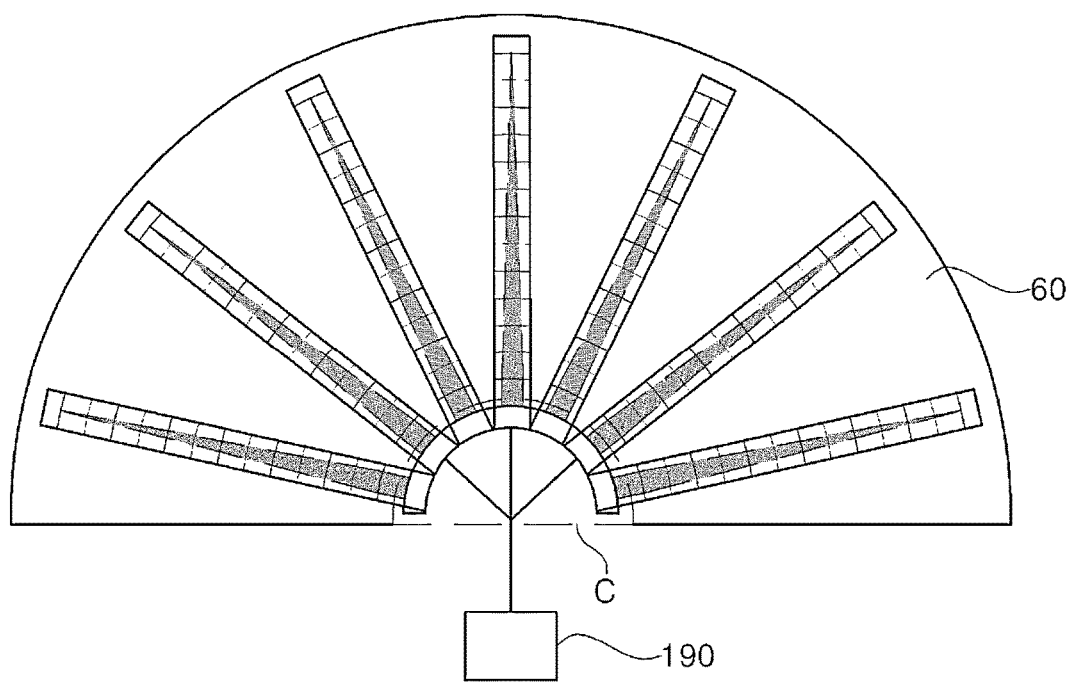
FIG. 17 is a plan view showing a stereoscopic display device according to still another embodiment of the present disclosure.

FIG. 17 is a plan view showing a stereoscopic display device according to still another embodiment of the present disclosure.

Referring to FIG. 17, the stereoscopic display device according to the present embodiment includes the base substrate, the three-dimensional effect forming part, the light source and a control part 190.

The base substrate includes a first base substrate, a second base substrate and a third base substrate having a rod or needle-like shape.

The three-dimensional effect forming part includes: a first three-dimensional effect forming part having a first pattern arranged on a first surface of the first base substrate; a three-dimensional effect forming part having a second pattern arranged on a first surface of the second base substrate; and a third three-dimensional effect forming part having a third pattern arranged on a first surface of the third base substrate.

The light source includes: a first light source disposed at one end of the first pattern and irradiating a first incident beam from one end to another end; a second light source disposed at one end of the second pattern and irradiating a second incident beam from the one end to the other end; and a third light source disposed at one end of the third pattern and irradiating a third incident beam from the one end to the other end.

The first base substrate, the second base substrate and the third base substrate are disposed in a radial form such that the first light source, the second light source and the third light source are disposed at a central portion of a printing part 40 having a semicircular or semielliptical shape, and the incident beam is irradiated from the central portion C in different radial directions.

The control part 190 is connected to the first light source, the second light source and the third light source so as to selectively control a turn-on motion of these light sources. The control part 190 may be any one of various vehicle controllers mounted to the vehicle. The stereoscopic display device is connected to a vehicle battery and is operated by power of the vehicle battery.

According to the present embodiment, the stereoscopic display devices in a multiple needle form are arranged in a dashboard-like shape and are selectively controlled so that the stereoscopic display device arranged at a specific position can be operated according to an input control signal corresponding to a vehicle speed, thereby enabling implementation of a vehicle dashboard.

The stereoscopic display device of the aforesaid embodiments may be used in various dashboards in addition to the dashboard for the vehicle. Also, the stereoscopic display device may be utilized in a thermometer, a clock, a direction guiding display panel and the like.

Figure 18:
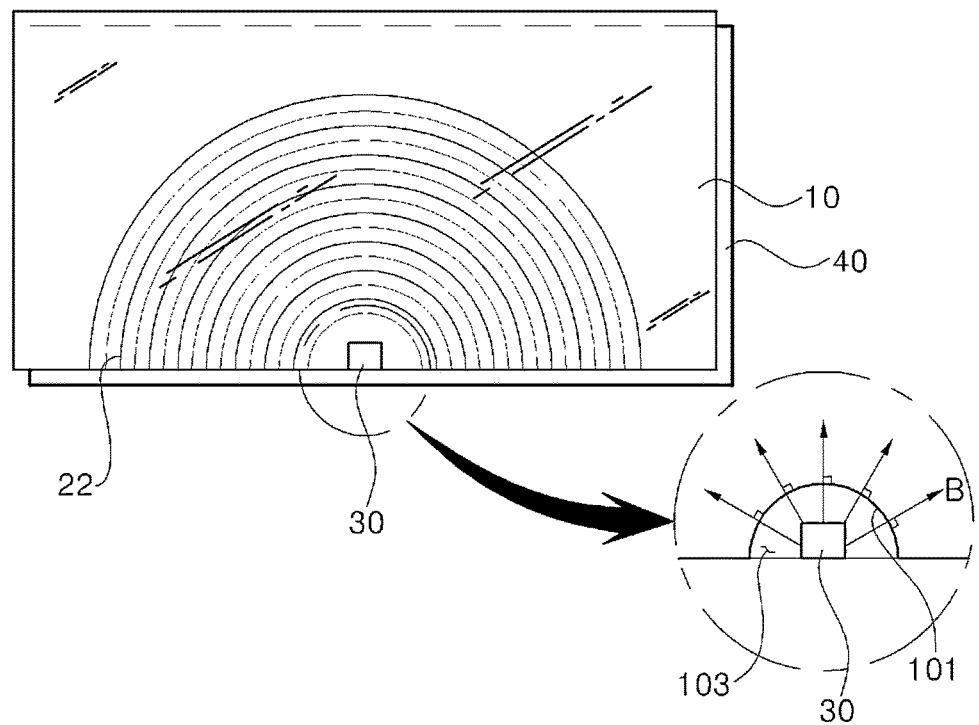
FIG. 18 is a plan view showing a stereoscopic display device (hereinafter briefly referred to as 'display device' according to still another embodiment of the present disclosure (hereinafter briefly referred to as 'display device')

FIG. 18 is a plan view showing a stereoscopic display device (hereinafter briefly referred to as 'display device' according to still another embodiment of the present disclosure (hereinafter briefly referred to as 'display device').

Referring to FIGS. 1 and 18, a display device 100 according to the present embodiment has the base member 10, the radial pattern and the reflective layer 40. Also, the display device according to the present embodiment may further include the light source 30.

The base member 10 enables the beam incident from one side to spread out as flat light by guiding the beam in the interior. The base member 10 may be an optical film having a light guide function.

On side 101 of the base member is arranged so that the beam B of the light source 30 is incident at appropriately a right angle. The one side 101 of the base member may have a semicircular shape that surrounds the light source 30.

A thickness of the base member 10 may be appropriately selected in the range of hundreds of μm to several mm according to application of the display device. The base member 10 may be made of acryl resin in terms of high transparency, high hardness, and a low cost. Also, the base member 10 may be composed using an optical resin such as polycarbonate (PC), polymethylmethacrylate (PMMA), polystyrene (PS), ARTON, ZEONOR and the like.

The radial pattern 22 is provided on one surface of the base member 10. The radial pattern 22 refers to a pattern form in which pattern units are diffused in a radial form based on a predetermined radial center portion. That is, the radial pattern 22 may refer to a simple pattern as a constitutive element for implementing a line-shaped beam or a line-shaped beam having a three-dimensional effect. A pattern shape of the radial pattern 22 may be a prism shape or a lenticular shape. When the radial pattern 22 is used, a background or an image having a three-dimensional effect may be easily implemented.

The radial pattern 22 may be formed on one surface of the base member 10 by mechanically processing one surface of the base member 10 in a predetermined pattern. When the radial pattern 22 is formed by a mechanical processing method using a tool such as a bite and the like, a surface of the radial pattern 22 may be treated as a mirror-like finishing surface via a separate process forming the mirror-like finishing surface. The radial pattern 22 may have an arithmetic mean roughness Ra of about 0.02 or less, and a maximum height roughness Rmax of about 0.15 to 0.30 or less. This value results from considering a surface roughness similar to an average surface roughness of aluminum.

The reflective layer 40 is arranged on one surface of the base member 10 and reflects light passing through the radial pattern 22 to the radial pattern 22 again. When this reflective layer 40 is used, light efficiency and luminous of the display device may be increased, a three-dimensional effect by the radial pattern 22 may be more clearly shown in the display device.

The reflective layer 40 may contain Al, Ag, a white material or a combination thereof. For example, the reflective layer 40 may be implemented by coating one surface of the base member with a reflection material or using a film substrate impregnated with a reflection material.

The light source 30 is arranged in the radial center portion of the radial pattern 22 and emits light to one side 101 of the base member 10. An LED (Light Emitting Diode) may be used as the light source 30. For example, the light source 30 may be implemented using a side-type light emitting chip LED or a top emission type chip LED. In the case of the top emission type chip LED, the light sources 30 is disposed in a form in which an upper surface of the LED is bent at about 90° to face one side of the base member 10.

Also, when the light source 30 is arranged in the radial center portion of the radial pattern 22, the separation space 103 may be provided between the light source 30 and one side 101 of the base member 10. The separation space 103 may be implemented as an empty space filled with air and the like according to some embodiments.

When the separation space is arranged between the light source 30 and the one side of the base member 10, the light emitted from the light source 30 passes through an air layer of the separation space 103 and penetrates a medium having a different refractive index so that a diffusion property or a scattering property of the light can be improved. Then, the light penetrates the medium having the different refractive index again via the base member so that uniformity of the diffused and scattered light can be improved.

In the present embodiment, when the display device 100 is used as the background of a dashboard for a vehicle, the light source 30 may be connected to the driving part (see reference numeral 220 of FIG. 31) that rotates an indicator (see reference numeral 210 of FIG. 31) having a needle-like shape of the dashboard for the vehicle at a predetermined angle according to the speed of an object. For example, the light source 30 may be connected to the driving part for rotation of the indicator and may be arranged on a rotation axis (see reference numeral 222 of FIG. 31) provided at the radial center portion of the radial pattern. Of course, according to some embodiments, the light source 30 may be arranged in the radial center portion of the radial pattern in a buried state by resin and the like without being arranged on the rotation axis.

According to the present embodiment, the light incident from the radial center portion of the radial pattern 22 is guided to the inside of the base member 10 and is reflected from each pattern unit of the radial pattern 22. The light reflected from each pattern unit may be reproduced as beams having different kinds of brightness according to a relative distance with the light source. According to the operation of the radial pattern, the display device 100 may simply implement the light incident from the light source to the radial pattern 22 as three-dimensional lighting having a size corresponding to an area of the radial pattern.

Figure 19:
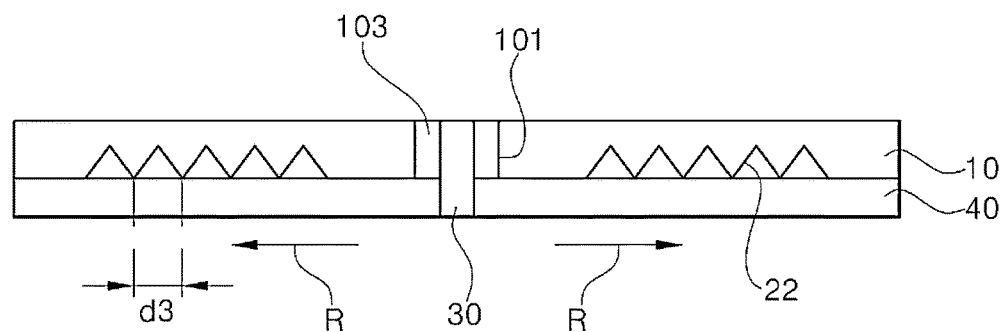
FIG. 19 is a front view of the display device of FIG. 18.

FIG. 19 is a front view of the display device of FIG. 18.

Referring to FIG. 19, in the display device according to the present embodiment, the radial pattern 22 provided on one surface of the base member 10 has a plurality of unit patterns having a predetermined pitch d3 in a radial direction R with respect to the light source 30 arranged at a radial central portion.

This unit pattern arrangement may have substantially the same shape in a straight line (a straight line extending in a radial direction, see BL0 of FIG. 4) passing through the radial pattern 22 via the radial center portion. Also, in consideration of the operational principle of the radial pattern, images of a specific sign or word may be three-dimensionally displayed by changing a pitch of the pattern or a pattern shape (see FIGS. 28 and 30).

As such, according to the present embodiment, the three-dimensional stereoscopic display device capable displaying stereoscopic images and having the easy of production may be efficiently provided.

Figure 20:
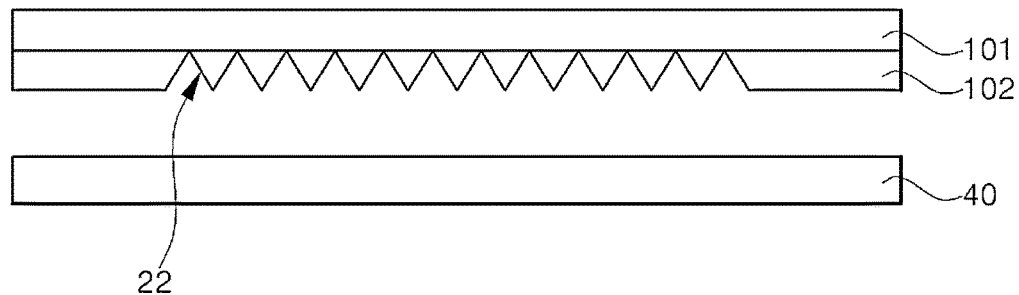
FIG. 20 is a partially exploded front view showing a modified example of the display device of FIG. 19.

FIG. 20 is a partially exploded front view showing a modified example of the display device of FIG. 19.

Referring to FIG. 20, the display device according to the present embodiment has a base layer 101, a radial pattern layer 102 and a reflective layer 40.

When compared to the base member 10, the base layer 101 refers to a substrate in which the radial pattern 22 is not provided on one surface of the base layer. The base layer 101 may be identical to the base member except for the fact that the radial pattern 22 is not provided on one surface of the base layer.

The radial pattern layer 102 is formed on one surface of the base layer 101. The radial pattern layer 102 may be formed on one surface of the base layer 101 with a separate material. In the present embodiment, the radial pattern layer 102 may be provided by applying a thermosetting resin or a photocurable resin to one surface of the base layer 101 and curing the one surface of the base layer coated with the resin.

For example, the radial pattern layer 102 having the radial pattern 22 may be provided by filling a mold having a mold pattern for forming the radial pattern with resin in a state of the mold being put on the base layer 101, and thereafter curing the resin.

In the present embodiment, the base layer 101 may include a transparent film of PET (Polyethylene Terephthalate) and the like. The radial pattern layer 102 may include a thermosetting resin or a photocurable resin. As such, the radial pattern 22 of the present embodiment may be provided on the base layer 101 or on one surface of the base member using a different production process from that for the base layer or the base member with a different material from that of the base layer or the base member.

Figure 21:
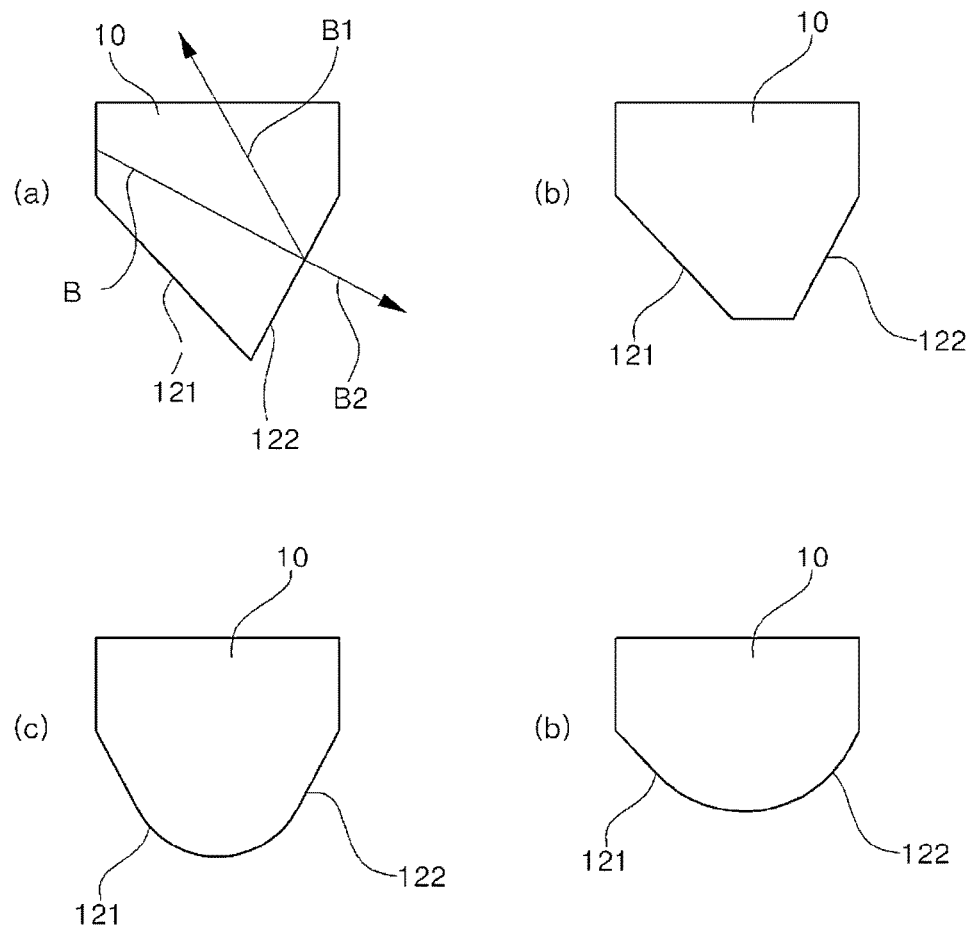
FIG. 21 is a view showing various examples for a radial pattern of the display device of FIG. 19.

FIG. 21 is a view showing various examples for a radial pattern of the display device of FIG. 19.

Referring to FIG. 21, the radial pattern of the display device according to the present embodiment may have various pattern shapes. For example, the pattern shape of the radial pattern may include a prism-like shape or a lenticular shape.

Specifically, the pattern shape of the radial pattern may include a prism type pattern cross section having at least two reflective surfaces 121, 122 as illustrated in (A) of FIG. 21.

The reflective surfaces 121, 122 may be mirrors that completely reflect the incident beam. Also, according to some embodiment, the reflective surfaces 121, 122 may be half mirrors having predetermined transmittance and reflectance according to a production process. In this case, a part of the beam B incident to the radial pattern creates a reflective beam B1 that is reflected from an internal surface of the radial pattern at least once, and the remaining part of the beam B creates a transmitted beam B2 that penetrates the surface of the radial pattern. The transmitted beam B2 is reflected from the reflective layer so as to be incident to the inside of the radial pattern again. That is, the surface of the radial pattern may be a half mirror having predetermined transmittance and reflectance.

According to another embodiment, the radial pattern may include a pattern cross section having a trapezoidal shape in which the end of a prism-shaped pattern cross section is cut as shown in (B) of FIG. 21.

According to a further embodiment, the radial pattern may include a semicircular pattern cross section having at least two reflective surfaces 121, 122 as illustrated in (C) of FIG. 21.

According to yet another embodiment, the radial pattern may include a semielliptical pattern cross section having the larger radius of curvature than that of the semicircular pattern cross section as illustrated in (D) of FIG. 21.

According to each shape of the pattern cross section described above, in the display device according to the present embodiment, the pattern shape of the radial pattern in a radial direction may include a triangular shape, a trapezoidal shape, a semicircular shape, a semielliptical shape or a connection arrangement resulting from a combination thereof.

According to the present embodiment, when the light incident from the light source arranged in the radial center portion, the light travels from the patterns adjacent to the radial center portion to the patterns located far away from the radial center portion so that a three-dimensional stereoscopic background or image can be displayed by a difference in light reflection or concentration levels.

The radial pattern 22 of the display device according to the present embodiment is arranged in a form in which mountain-shaped convex parts M and valley-shaped concave parts V are alternatively disposed and radially extend from the radial center portion C (see FIG. 4). In this case, in the radial pattern 22, a first distance d1 between the patterns adjacent to the radial center portion in the radial direction BL0 is narrower than a second distance LP/d2 between the patterns adjacent an edge. Also, these distances may be configured such that the distance between the patterns the closest to the radial center portion C and the distance between the patterns located farthest away from the radial center portion C are gradually increased at a predetermined rate. According to the pattern distance arrangement of the radial pattern 22, the quantity of light reflected and scattered from the patterns adjacent to the radial center portion C may be increased, and the quantity of light reflected and scattered from the patterns located far way from the radial center portion C may be reduced so that a three-dimensional effect resulting from a difference in the quantity of light can be more improved.

Figure 22:
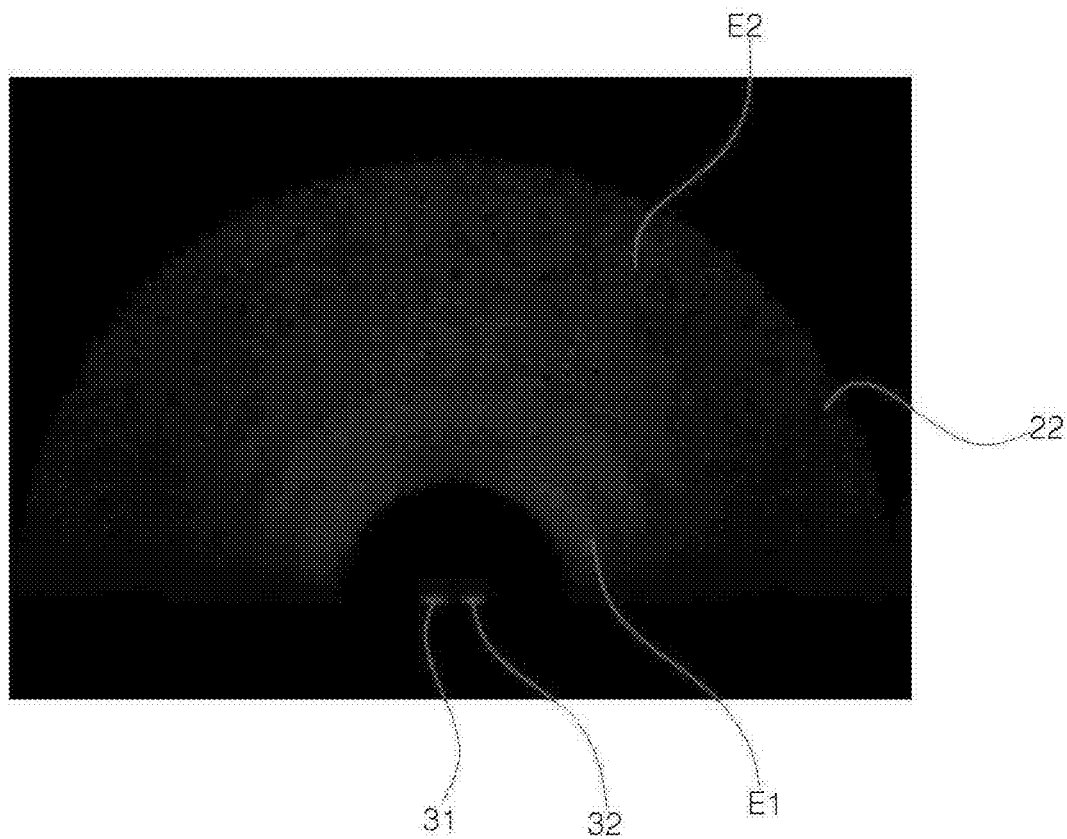
FIG. 22 is an exemplary view showing an operational state of the display device of FIG. 18.

FIG. 22 is an exemplary view showing an operational state of the display device of FIG. 18.

As shown in FIG. 22, when the light is irradiated from two light sources 31, 32 installed in the radial center portion to the radial pattern 22 via the base member, the display device according to the present embodiment may display lighting having a three-dimensional effect having a size corresponding to an area of the radial pattern 22. In FIG. 22, the quantity of light generated from a portion E1 adjacent to the light sources 31, 32 is larger than that generated from a portion E2 located far away from the light sources 31, 32.

As such, in the display device according to the present embodiment, the radial pattern is formed on one surface of the base member having a light guiding function, and the radial pattern is arranged so that light can be irradiated from the radial center portion to one side of the base member, thereby enabling images having a three-dimensional effect to be easily implemented in an area where the radial pattern is formed.

Figure 23:
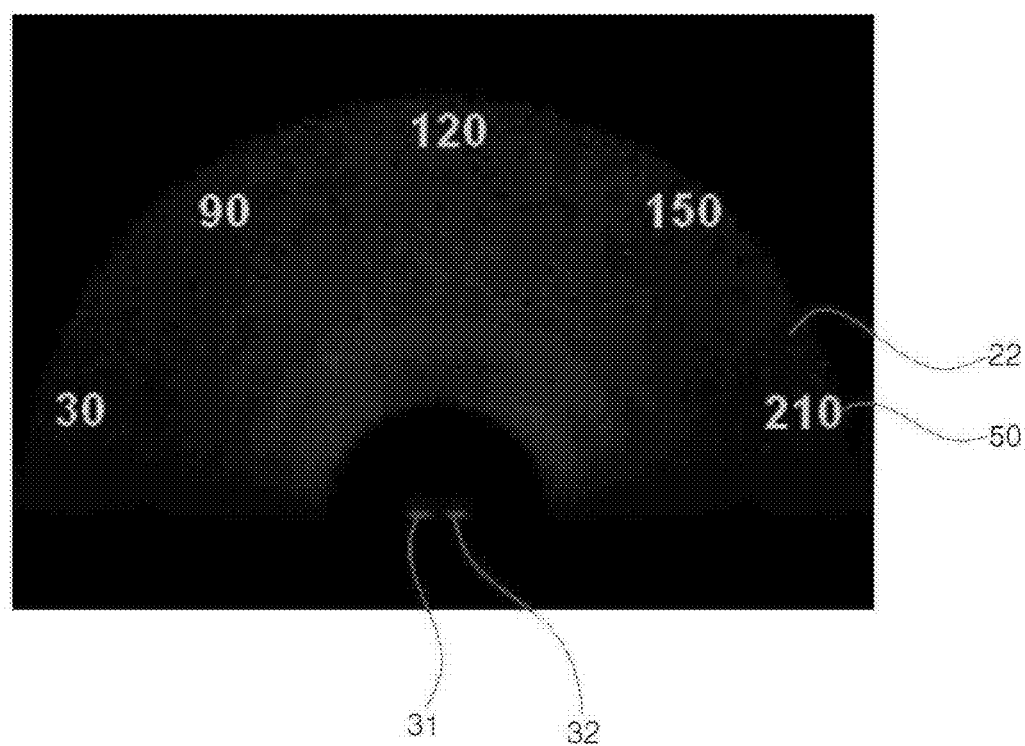
FIG. 23 is an exemplary view of a dashboard in which the display device of FIG. 22 is used as a background member.

FIG. 23 is an exemplary view of a dashboard in which the display device of FIG. 22 is used as a background member.

As shown in FIG. 23, the display device of FIG. 22 may be used as a background member of a dashboard such as a vehicle dashboard and the like. In this case, a sign 50 of the dashboard such as a number, word or the like may be printed on the reflective layer or the base member or may be buried.

When the display device of the present embodiment is used as the vehicle dashboard, at least one light source located in the radial center portion of the radial pattern of the display device may be provided to be connected to a rotation axis for rotating an indicator in a needle-like shape that displays a vehicle speed in the vehicle dashboard. In this case, the light source may be manufactured to be separated from the base member and the reflective layer (see reference numeral 30 of FIG. 31).

As such, the display device according to the present embodiment may be implemented as the stereoscopic display device including the base member, the radial pattern and the reflective layer without the light source according to an application product before a complete product.

Figure 24:
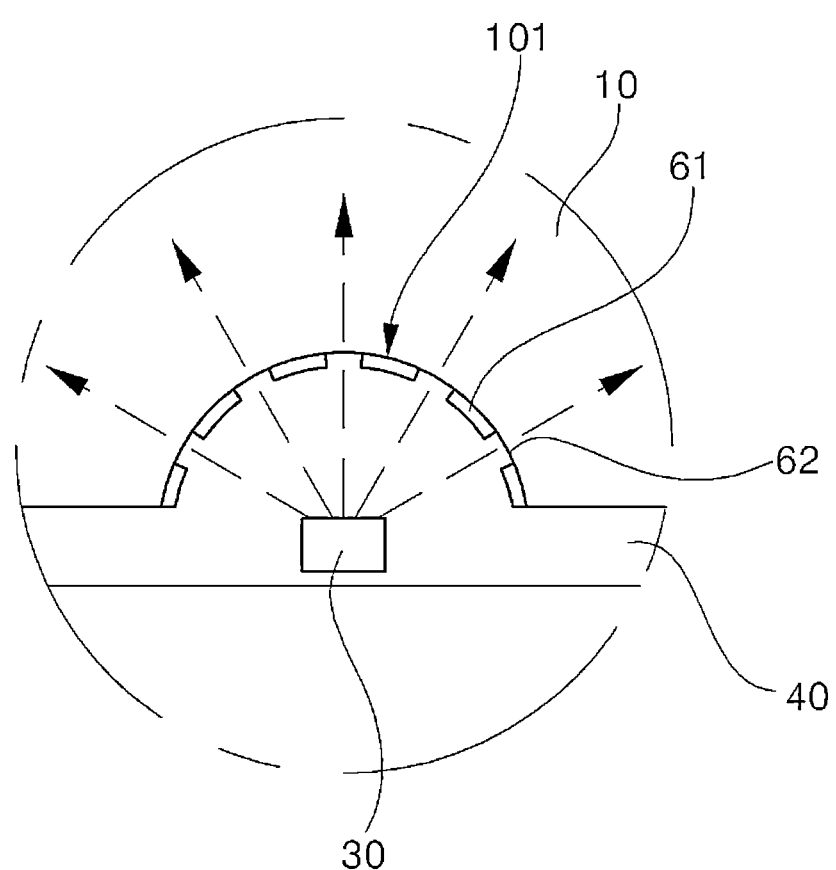
FIG. 24 is a partially enlarge plan view showing the main portion of a stereoscopic display device according to still another embodiment of the present disclosure.

FIG. 24 is a partially enlarge plan view showing the main portion of a stereoscopic display device according to still another embodiment of the present disclosure. The main portion of FIG. 24 corresponds to an enlarged portion indicated by an alternated long and short dash line of FIG. 18.

Referring to FIG. 24, the base member 10 of the display device according to the present embodiment includes a reflective surface 61 and a light incident surface 62 provided on one side 101 facing the light source 30, respectively.

The reflective surface 61 may be provided by coating a portion of one side of the base member 10 with a predetermined reflection material. The reflective surface 61 may be made of the same material as the reflection material contained in the reflective layer.

The light incident surface 62 is limited by the reflective surface 61 and includes a plurality of slit-like shapes extending to a thickness direction of the base member 10. The light incident surface 62 of the plurality of slit-like shapes may be arranged at a position provided so that illumination can be concentrated on an area where a signal or a word to be displayed in the display device is located.

Figure 25:
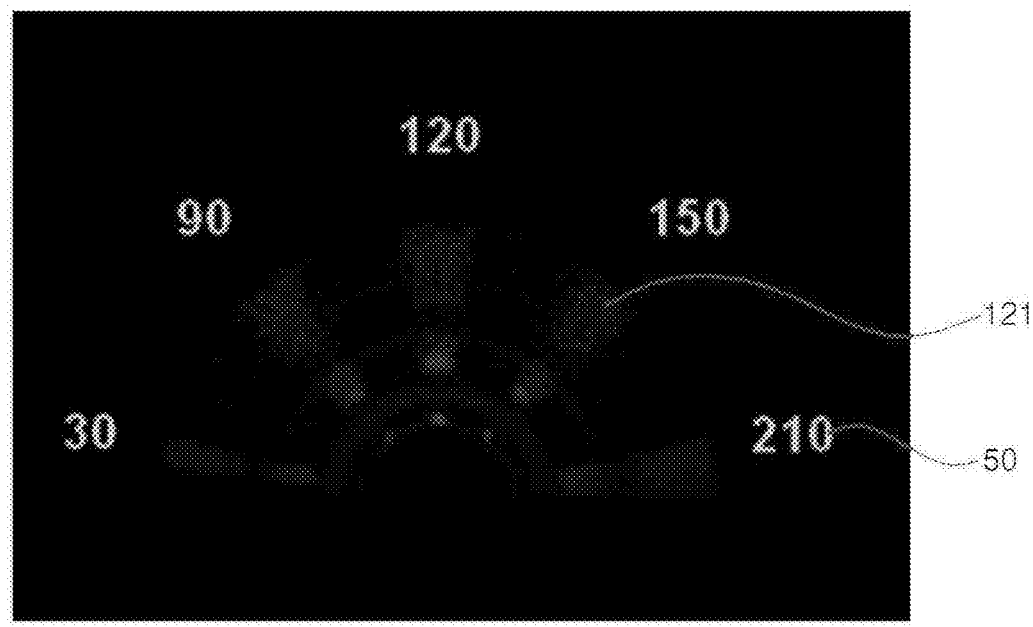
FIG. 25 is an exemplary view showing an operational state of the display device of FIG. 24.

FIG. 25 is an exemplary view showing an operational state of the display device of FIG. 24.

As shown in FIG. 25, the display device according to the present embodiment may intensively display a three-dimensional stereoscopic background in a pre-divided area 121 based on the number 50 to be displayed in an application product as a background member of the application product (the vehicle dashboard and the like).

According to the present embodiment, the stereoscopic display device capable of displaying 3D stereoscopic backgrounds or images in various design forms via various dashboards may be provided.

Figure 26:
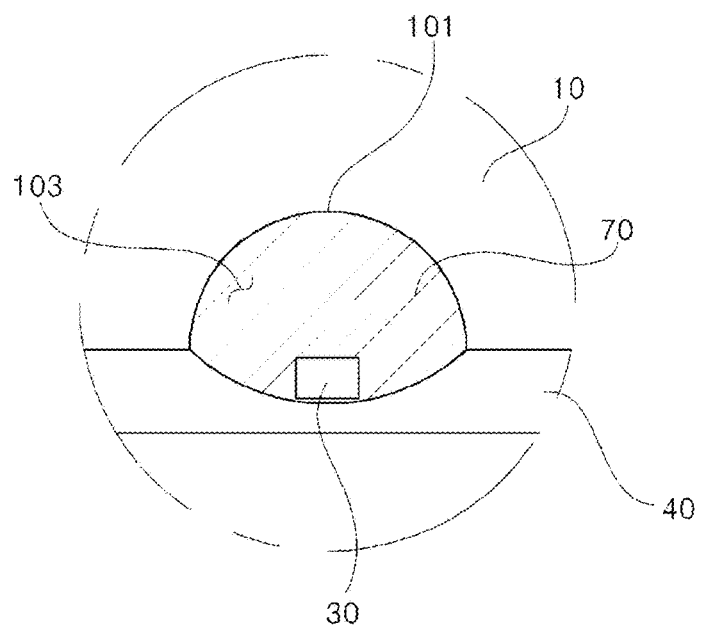
FIG. 26 is a partially enlarged plan view showing the main portion of a stereoscopic display device according to still another embodiment of the present disclosure.

FIG. 26 is a partially enlarged plan view showing the main portion of a stereoscopic display device according to still another embodiment of the present disclosure.

Referring to FIG. 26, the display device according to the present embodiment includes: the base member 10; the radial pattern; the reflective layer 40; and a resin layer 70.

The resin layer 70 is filled in the separation space 103. The resin layer 70 is provided to cover a light emitting surface of the light source 30. The resin layer 70 may be formed to bury the light source 30. This resin layer 70 performs a function of primarily dispersing and diffusing light incident from the light source 30 at a front end of the base member 10.

When the separation space 103 is filled with resin to cover at least one portion (light emitting surface and the like) of the light source 30, light efficiency of the LED light source can be improved. That is, in the separation space 103, when the resin layer 70 is formed to closely attached to the light source 30, a refractive index of the resin layer used as a phosphor silicon and an optical member disposed in front of the LED light source is changed, namely, due to a different in the refractive index, the quantity of light emitted from the LED light source may be increased compared to a case in which the light is directly emitted to the air.

For example, in general, since the refractive index of the phosphor silicon located on the light emitting surface of the LED light source is 1.5, and the refractive index of the resin layer 70 is 1.47 (or using resin having this refractive index), a critical angle is increased due to a small difference in the refractive indexes of the mediums through which the light of the LED light source passes. As a result, the loss of light generated in the inside of the LED light source may be reduced so that a relatively large amount of light can be secured from the LED light source.

The resin layer 70 may be made of a high heat resistant UV curing resin including an oligomer. A content of the oligomer may range from 40 to 50 parts by weight. Also, urethane acrylate may be used as the UV curing resin without being limited thereto. In addition to this, at one material of epoxy acrylate, polyester acrylate, polyether acrylate, polybutadiene acrylate), and silicon acrylate may be used.

In particular, when urethane acrylate is used as an oligomer, two kinds of urethane acrylate are used in a state of being mixed so that different physical properties can be simultaneously implemented.

In such a case, the resin layer 60 may be made of a thermosetting resin containing at least one of a polyester polyol resin, an acryl polyol resin, a hydrocarbon and/or ester solvent. A hardener may be further contained in this thermosetting resin in order to improve strength of the film of paint.

Also, the resin layer 70 may further contain at least one of a monomer and a photo initiator. Furthermore, the resin layer 70 may be made of a thermosetting resin having high heat resistance.

Figure 27:
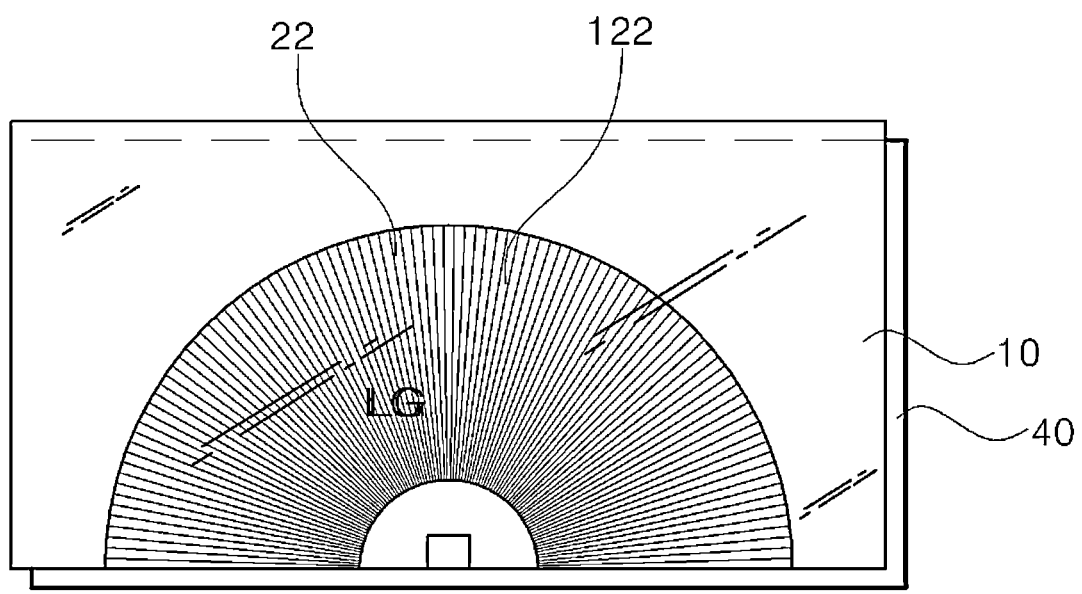
FIG. 27 is a plan view of a stereoscopic display device according to still another embodiment of the present disclosure.

FIG. 27 is a plan view of a stereoscopic display device according to still another embodiment of the present disclosure.

Referring to FIG. 27, the display device according to the present embodiment includes: the base member 10; the radial pattern 22; an image displaying area 122; and the reflective layer 40. The image displaying area 122 is displayed in a three-dimensional stereoscopic background using the radial pattern 22.

The image displaying area 122 may be a portion which the radial pattern 22 is removed, or may be a portion subjected to treatment (pattern surface treatment, treatment for embedding pattern uneven parts and the like) for removal of the function of the radial pattern 22. For example, the image displaying area 122 may be a portion in which some areas of the radial pattern 22 are removed in an intaglio shape according to a predetermined image 'LG'.

In the present embodiment, even though the English word 'LG' is displayed in the image displaying area 122, the present is not limited to this configuration. Various words, signs, designs and the like may be displayed in the image displaying area.

Figure 28:
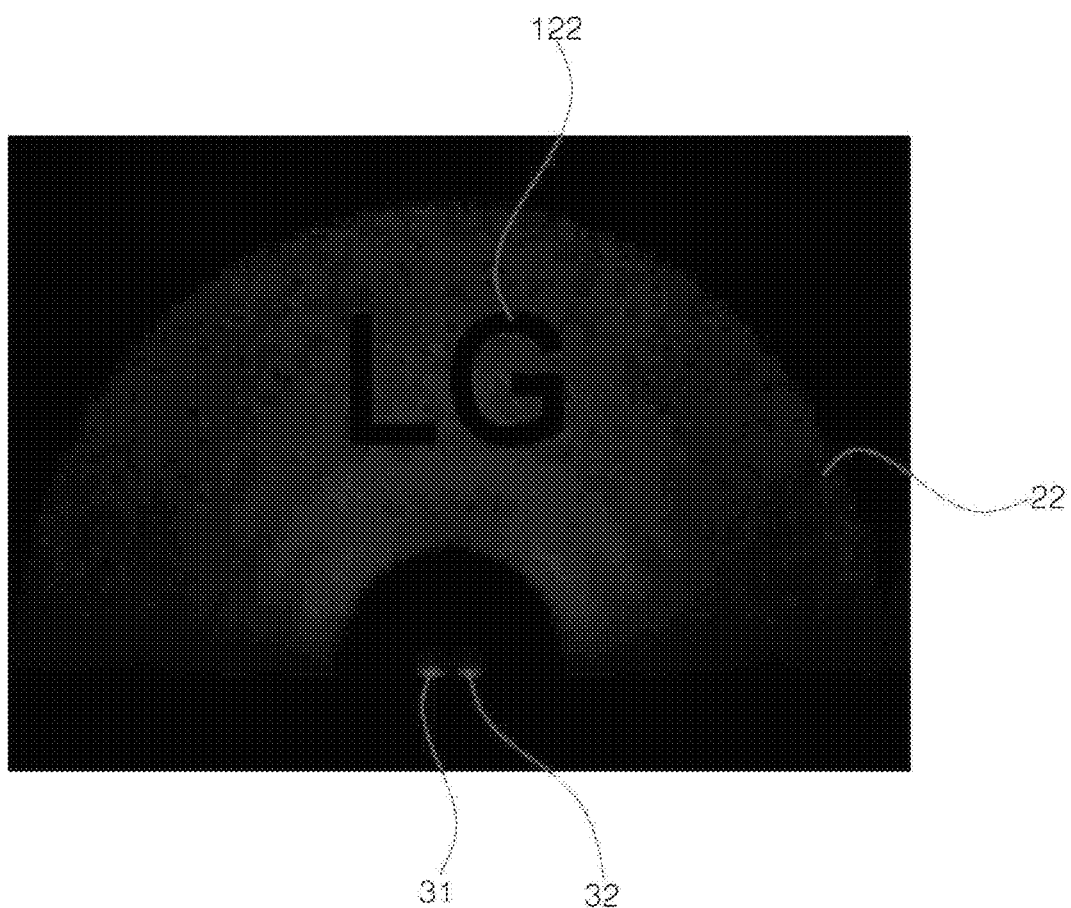
FIG. 28 is an exemplary view showing an operational state of the display device of FIG. 27.

FIG. 28 is an exemplary view showing an operational state of the display device of FIG. 27.

As shown in FIG. 28, the display device of the present embodiment displays a three-dimensional background arranged as a background of an image along with a customer's desired image on a dashboard area.

When the light of the light sources 31, 32 is incident to the radial pattern 22 provided in the dashboard area, the light has a relatively large scattering and diffusing property in a first radial portion adjacent to the light sources 31, 32 rather than a second radial portion located far away relatively from the light sources 31, 32. Thanks to this operation, the display device of the present embodiment displays the three-dimensional stereoscopic background on the dashboard (vehicle dashboard and the like).

Figure 29:
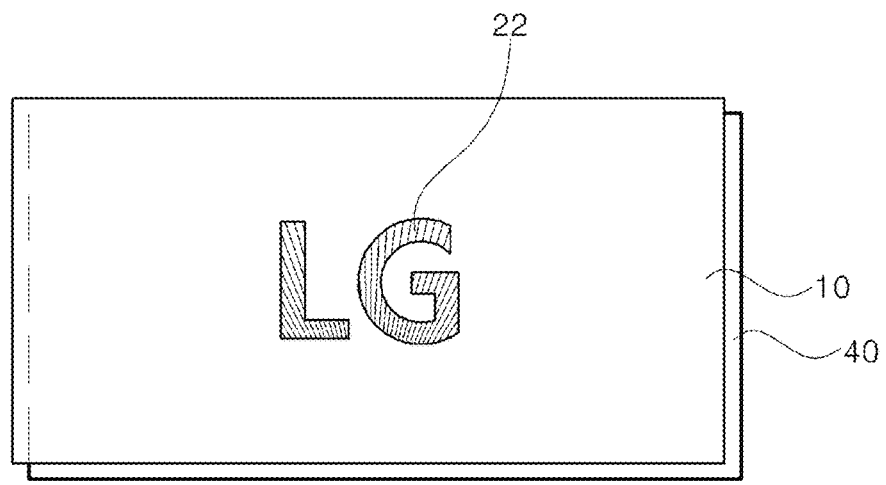
FIG. 29 is a plan view of a stereoscopic display device according to still another embodiment of the present disclosure.

FIG. 29 is a plan view of a stereoscopic display device according to still another embodiment of the present disclosure.

Referring to FIG. 29, the display device according to the present embodiment includes: the base member 10; the radial pattern 22; and the reflective layer 40.

The radial pattern 22 is only provided in an image displaying area. The radial pattern 22 of the present embodiment is only formed in the displaying area for an image to be displayed in a predetermined application product, but is not formed in a portion corresponding to a background of the image. That is, the radial pattern 22 is provided in an embossed form based on a peripheral portion on one surface of the base member.

Figure 30:
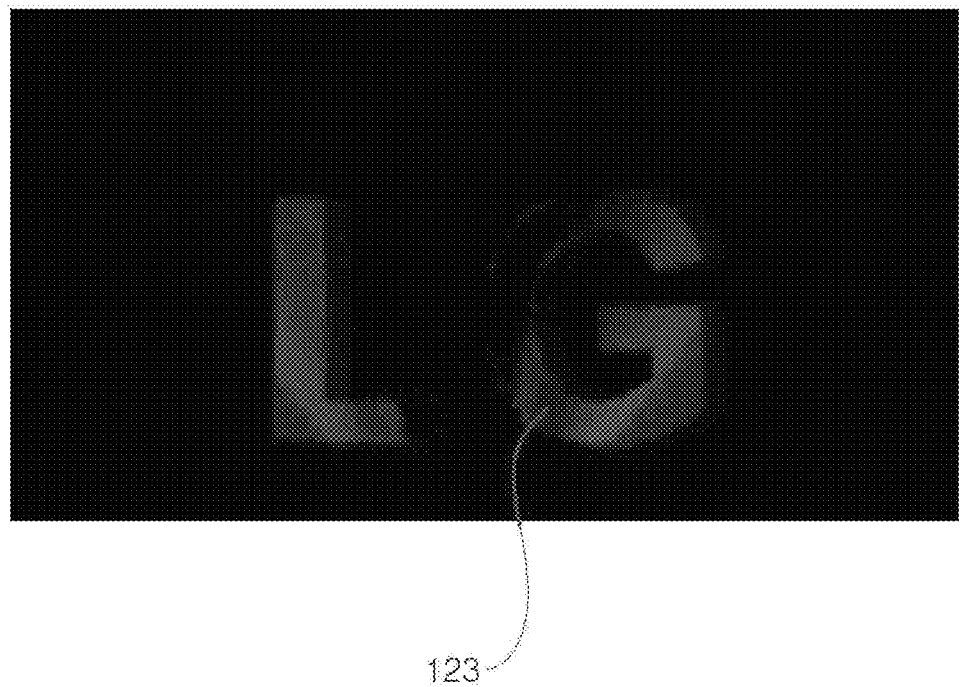
FIG. 30 is an exemplary view showing an operational state of the display device of FIG. 29.

The radial pattern 22 in the present embodiment is displayed as an area corresponding to the English word 'LG' as an image displaying area and may be provided as various words, signs, designs and the like without being limited thereto FIG. 30 is an exemplary view showing an operational state of the display device of FIG. 29.

As shown in FIG. 30, the display device according to the preset embodiment displays a three-dimensional stereoscopic image 123 on the base member 10 for dispersing and scattering light of the LED light sources 31, 32 via the radial pattern 22 arranged in an image to be displayed.

When the light is incident to one side of the base member 30, the light has a relatively large scattering and dispersing property in a first radial pattern portion adjacent to the light source rather than a second radial pattern portion located far away relatively form the light source. Thanks to this operation, the display device may display a three-dimensional stereoscopic image on the radial pattern 22.

According to the aforesaid embodiment, the stereoscopic display device capable of enabling an image for a sign or a design to be displayed to have a three-dimensional stereoscopic effect by adjusting a pattern shape of the radial pattern 22 or a pitch between the patterns may be provided.

Figure 31:
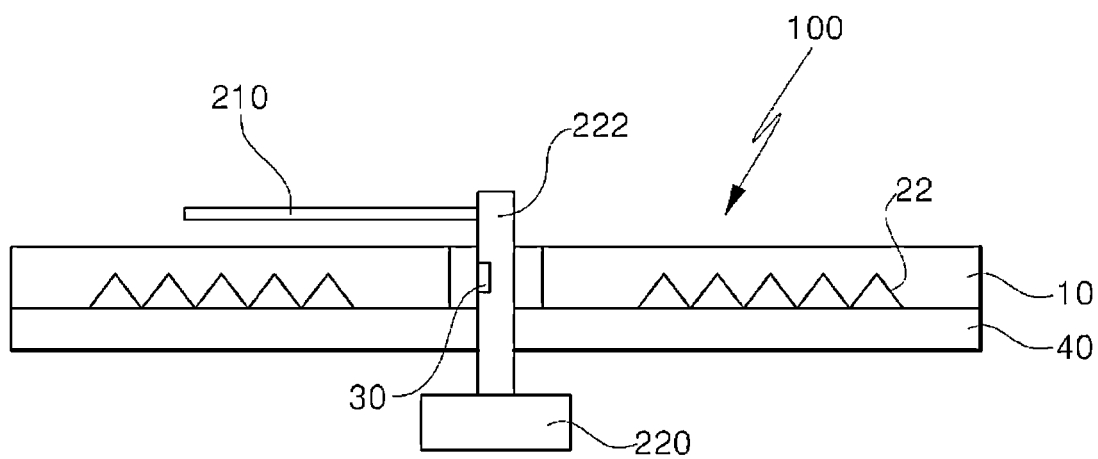
FIG. 31 is a sketchy cross-sectional view of a dashboard according to an embodiment of the present disclosure.

FIG. 31 is a sketchy cross-sectional view of a dashboard according to an embodiment of the present disclosure.

Referring to FIG. 31, the dashboard according to the present embodiment includes a background member 100 and an indicator 210. Also, the dashboard may have a driving part 220 for controlling the indicator 210, and a rotation axis 222 connecting the driving part 220 and the indicator 210.

The background member 100 may include the stereoscopic display device. In such a case, the background member 100 may display a three-dimensional stereoscopic background, a three-dimensional stereoscopic background, or a three-dimensional stereoscopic image.

The background member 100 may include: a base member; a radial pattern provided on one surface of the base member; and a reflective layer on one surface of the base member. Since the description of the background member overlaps with that of the stereoscopic display device, the detail description of the background member is omitted.

The indicator 210 has a needle-like shape that is rotated on the background member 100 at a predetermined angle according to a speed of an object (e.g., a vehicle and the like). The indicator 210 is coupled to the rotation axis 222 arranged in a radial center portion of the radial pattern and is rotated at a predetermined angle according to control of the driving part 220 intended for driving the rotation axis 222. In the case of such a configuration, the light source 30 irradiating light to one side of the base member may be disposed at the rotation angle 222 or between the rotation axis 222 and one side of the base member.

The light source 30 may be implemented as an LED mounted to the printed circuit board. Here, the printed circuit board refers to a substrate in which a conductive circuit pattern is formed on an insulating substrate or an insulating layer. Furthermore, in order to secure flexibility, the printed circuit board may be implemented as a flexible printed circuit board (FPCB).

As set forth above, according to some embodiments of the present disclosure, the stereoscopic display device can convert an incident beam into a line-shaped beam having a three-dimensional effect via a pattern design and can implementing various optical images using the line-shaped beam. This stereoscopic display device may be usefully applied to an interior or exterior display device, a lighting device, a dashboard for a vehicle or the like.

Also, according to some embodiments of the present disclosure, the stereoscopic display device can display optical images having a geometrical shape and can be applied to an application having flexibility and a bending portion. Furthermore, the stereoscopic display device has a simple structure so that a production cost can be reduced, and durability can be improved. Also, the dashboard using the stereoscopic display device may be provided.

In particular, when the stereoscopic display device according to some embodiments of the present disclosure is used, an interior design of the inside of a vehicle can be innovatively changed and expressed. The dashboard can express light having various colors via the LED (Light Emitting Diode) light source.

Furthermore, according to some embodiments of the present disclosure, the stereoscopic display device can show a geometrical 3D effect with three-dimensional light distribution by structurally concentrating the incident beam via a pattern design.

Also, according to some embodiments of the present disclosure, it can be provided with the stereoscopic display device that can have a function of changing the shape and three-dimensional effect of light according to a viewing angle by using a flexible resin layer in the light guide member and can be easily applied to an application having a bending portion such as a flexible housing.

Also, according to some embodiment of the present disclosure, it can be provided with the stereoscopic display device that can easily implement various designs using an optical image having a three-dimensional effect, and the three-dimensional stereoscopic dashboard.

As previously described, in the detailed description of the disclosure, having described the detailed exemplary embodiments of the disclosure, it should be apparent that modifications and variations can be made by persons skilled without deviating from the spirit or scope of the disclosure. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims and their equivalents.

An aspect of embodiments of the present disclosure provides a stereoscopic display device that can convert incident light into a line-shaped beam having a three-dimensional effect via a pattern design and can implement various optical images using the line-shaped beam.

An another aspect of embodiments of the present disclosure provides a stereoscopic display device that can display an optical image having a geometrical form rather than a simple light emission form and can be easily applied to an application having flexibility or a curve, and a dashboard using the stereoscopic display device.

A further aspect of embodiments of the present disclosure provides a stereoscopic display device that can provide various design effects using optical images having a three-dimensional effect, and a dashboard using the stereoscopic display device.

According to an aspect of embodiments of the present disclosure, a stereoscopic display device may include: a base substrate transmitting an incident beam; and a three-dimensional effect forming part on a first surface of the base substrate, wherein the three-dimensional effect forming part has a pattern, the pattern having multiple pattern units arranged in a first direction, each of the pattern units having an inclined surface having an inclination angle with respect to the first surface, wherein when an incident beam is incident to a central portion of the pattern, the pattern guides the incident beam in a first surface direction toward which the first surface looks or a second surface direction toward which a second surface opposite to the first surface looks, thereby implementing a line-shaped beam having a three-dimensional effect in a first path resulting a pattern arrangement direction.

In one embodiment, the stereoscopic display device may further include: a light source disposed in the central portion of the pattern; and a driving part rotating the light source at the central portion.

In one embodiment, the light source may include a plurality of sub-light sources that irradiates an incident beam from the central portion of the pattern in different radial directions.

According to another aspect of embodiments of the present disclosure, a stereoscopic display device may include: a base substrate transmitting an incident beam; and a three-dimensional effect forming part on a first surface of the base substrate, wherein the three-dimensional effect forming part has a pattern, the pattern having multiple pattern units arranged in a first direction, each of the pattern units having an inclined surface having an inclination angle with respect to the first surface, wherein when an incident beam is incident to a central portion of the pattern, the pattern guides the incident beam in a first surface direction toward which the first surface looks or a second surface direction toward which a second surface opposite to the first surface looks, thereby implementing a line-shaped beam having a three-dimensional effect in a first path resulting a pattern arrangement direction.

In one embodiment, the stereoscopic display device may further include a light source disposed at one end of the pattern on the base substrate. Here, the base substrate has a rod or needle-like shape and supports the three-dimensional effect forming part and the light source.

In one embodiment, the stereoscopic display device may further include a driving part connected to the base substrate. The driving part may rotate the base substrate in a circular or elliptical shape based on the one end of the based substrate on which the light source is disposed.

In one embodiment, the base substrate may include a first base substrate, a second base substrate and a third base substrate each having a rod or needle-like shape, the three-dimensional effect forming part may include a first three-dimensional effect forming part, a second three-dimensional effect forming part, and a third three-dimensional effect forming part, and the light source may include a first light source, a second light source and a third light source and a fourth light source that are disposed at one end of the pattern and irradiate an incident beam from the one end to another end. Here, the first base substrate, the second base substrate and the third base substrate may be disposed such that the first light source, the second light source and the third light source are installed in a central portion of a printing part having a circular or elliptical shape and irradiate the incident beam from the central portion to different directions.

In one embodiment, the stereoscopic display device may further include a control part selectively controlling the first to third light sources.

According to a further aspect of embodiments of the present disclosure, a dash board using the stereoscopic display device according to any one of the aforesaid embodiments may be provided. Here, the stereoscopic display device may be connected to a vehicle controller or a vehicle battery and may be operated by power of the vehicle battery.

According to yet another aspect of embodiments of the present disclosure, a stereoscopic display device may include: a base member having one surface on which a radial pattern is provided; and a reflective layer on the one surface of the base member.

In one embodiment, a pattern shape of the radial pattern may be a prism or lenticular form.

In one embodiment, a pattern shape of the radial pattern in a radial direction may include a triangular shape, a trapezoidal shape, a semicircular shape, a semielliptical shape or a connection arrangement resulting from a combination thereof.

In one embodiment, a surface of the radial pattern may be a half mirror having a predetermined refractive index and a predetermined reflective index.

In one embodiment, a first distance between patterns adjacent to the radial center portion in a radial direction of the radial pattern may be smaller than a second distance between patterns located far away relatively from the radial center portion.

In one embodiment, the reflective layer may contain Al, Ag, a white material or a combination thereof.

In one embodiment, the stereoscopic display device may further include a light source disposed in a radial center portion of the radial pattern.

In one embodiment, the stereoscopic display device may further include a separation part between one side of the base member and the light source, In one embodiment, the one side of the base member may include a light incident surface and a reflective surface. Here, the light incident surface may be limited by the reflective surface and may have a plurality of slit-like shapes extending in a thickness direction of the base member.

In one embodiment, the stereoscopic display device may further include resin filled in the separation part.

In one embodiment, a material of the base member may be acryl resin. Also, the material of the base member may be polycarbonate (PC), polymethylmethacrylate (PMMA) or polystyrene (PS).

In one embodiment, a surface of the radial pattern may be a mirror-like finishing surface and may have an arithmetic mean roughness (Ra) of 0.02 or less and a maximum height roughness (Ry) of 0.15 to 0.30 or less.

In one embodiment, the radial pattern may be provided on one surface of the base member with a different material from that of the base member.

In one embodiment, a material of the radial pattern may be a thermosetting resin or a photocurable resin.

In one embodiment, the stereoscopic display device may further include an image displaying area having an embossed shape resulting from removing a partial area of the radial pattern.

In one embodiment, the radial pattern may be only provided in the image display area having the embossed shape on the base member.

According to still another aspect of embodiments of the present disclosure, a stereoscopic dashboard may include a background member including a stereoscopic display device of any one of the aforesaid embodiments; and an indicator having a needle-like shape that is rotated on the background member at a predetermined angle according to a speed of an object. Here, the object may be a vehicle.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic display device, comprising:
a base substrate transmitting an incident beam of a light source;
a three-dimensional effect forming part on a first surface of the base substrate; and
a driving part to rotate the light source,
wherein the three-dimensional effect forming part has a pattern, the pattern having multiple pattern units arranged in a first direction, each of the pattern units having an inclined surface having an inclination angle with respect to the first surface,
wherein when an incident beam is incident to a central portion of the pattern, the pattern guides the incident beam in a first surface direction toward which the first surface looks or a second surface direction toward which a second surface opposite to the first surface looks, thereby displaying a line-shaped beam having a three-dimensional effect in a first path resulting a pattern arrangement direction,
wherein the light source is disposed in the central portion of the pattern, and the driving part rotates the light source at the central portion so as to rotate the line-shaped beam in an extending direction of the multiple pattern units.

2. The stereoscopic display device of claim 1, wherein the inclined surface is a mirror-like finishing surface and has an arithmetic mean roughness (Ra) of 0.02 or less and a maximum height roughness (Ry) of 0.30 or less.

3. The stereoscopic display device of claim 2, wherein a width or a pitch between two adjacent pattern units of the pattern ranges from 10 to 500 µm, a first pitch of a first pattern of a first pattern area adjacent to a central portion of the pattern in a radial direction is different from a second pitch of a second pattern of a second pattern area adjacent to an edge of the pattern.

4. The stereoscopic display device of claim 1, wherein the base substrate is a resin layer, and the three-dimensional effect forming part is provided as a pattern layer bonded to the first surface of the base substrate.

5. The stereoscopic display device of claim 4, wherein the pattern is provided on a first surface of the pattern layer, and a second surface opposite to the first surface of the pattern layer is bonded to the first surface of the base substrate.

6. The stereoscopic display device of claim 5, further comprising a reflective layer on the first surface of the pattern layer.

7. The stereoscopic display device of claim 6, comprising a separation area, an adhesive pattern, a reflective pattern or a combination thereof between the pattern and the reflective layer.

8. The stereoscopic display device of claim 1, further comprising a separation layer between the pattern and the base substrate,
wherein the base substrate is a resin layer, the three-dimensional effect forming part is provided as a pattern layer bonded to the first surface of the base substrate, the pattern is provided on the first surface of the pattern layer, the separation layer is mounted to the first surface of the pattern layer, and the first surface of the pattern layer is buried by the resin layer.

9. The stereoscopic display device of claim 1, wherein the light source emitting the incident beam comprises a plurality of sub-light sources that irradiates the incident beam from the central portion of the pattern in different radial directions.

10. The stereoscopic display device of claim 1, wherein the base substrate and the three-dimensional effect forming part are provided with a single substrate, and the three-dimensional effect forming part is arranged in the inside or on a surface of the single substrate.

11. The stereoscopic display device of claim 1, wherein the light source is disposed at one end of the pattern on the base substrate, wherein the base substrate has a rod or needle-like shape and supports the three-dimensional effect forming part and the light source.

12. The stereoscopic display device of claim 11, wherein the driving part rotates the base substrate in a circular or elliptical shape based on the one end of the based substrate on which the light source is disposed.

13. The stereoscopic display device of claim 11, wherein the base substrate comprises a first base substrate, a second base substrate and a third base substrate each having a rod or needle-like shape,
the three-dimensional effect forming part comprises:
a first three-dimensional effect forming part having a first pattern arranged on a first surface of the first base substrate;
a second three-dimensional effect forming part having a second pattern arranged on a first surface of the second base substrate; and
a third three-dimensional effect forming part having a third pattern arranged on a first surface of the third base substrate, and
the light source comprises:
a first light source disposed at one end of the first pattern and irradiating a first incident beam from the one end to another end;
a second light source disposed at one end of the second pattern and irradiating a second incident beam from the one end to another end;
a third light source disposed at one end of the third pattern and irradiating a third incident beam from the one end to another end,
wherein the first base substrate, the second base substrate and the third base substrate are disposed such that the first light source, the second light source and the third light source are installed in a central portion of a printing part having a circular or elliptical shape, and irradiate the incident beam from the central portion to different directions.

* * * * *